(12) United States Patent
Jeong

(10) Patent No.: US 12,030,154 B2
(45) Date of Patent: Jul. 9, 2024

(54) TOOL MAGAZINE

(71) Applicant: DN SOLUTIONS CO., LTD., Changwon-si (KR)

(72) Inventor: Seonghoon Jeong, Gimhae-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 431 days.

(21) Appl. No.: 17/427,572

(22) PCT Filed: Feb. 11, 2020

(86) PCT No.: PCT/KR2020/001909
§ 371 (c)(1),
(2) Date: Jul. 30, 2021

(87) PCT Pub. No.: WO2020/166941
PCT Pub. Date: Aug. 20, 2020

(65) Prior Publication Data
US 2022/0105596 A1    Apr. 7, 2022

(30) Foreign Application Priority Data

Feb. 11, 2019 (KR) .................. 10-2019-0015773

(51) Int. Cl.
*B23Q 3/157* (2006.01)
*B23Q 3/155* (2006.01)

(52) U.S. Cl.
CPC ..... *B23Q 3/15526* (2013.01); *B23Q 3/15513* (2013.01); *B23Q 3/15724* (2016.11);
(Continued)

(58) Field of Classification Search
CPC ............ B23Q 3/15724; B23Q 3/15726; B23Q 3/1574; B23Q 2003/15527;
(Continued)

(56) References Cited

U.S. PATENT DOCUMENTS

| | | | |
|---|---|---|---|
| 3,449,822 A * | 6/1969 | Jacob, Jr. ........... | B23Q 3/15773 483/8 |
| 4,358,888 A * | 11/1982 | Zankl ................. | B23Q 3/15526 414/223.01 |
| 6,083,146 A * | 7/2000 | Earley, Jr. .......... | B23Q 3/15724 483/65 |
| 6,740,839 B1 | 5/2004 | Kung et al. | |

(Continued)

FOREIGN PATENT DOCUMENTS

| | | | |
|---|---|---|---|
| CN | 109015063 A * | 12/2018 | ......... B23Q 3/15713 |
| DE | 2109536 A1 * | 10/1971 | ... B23Q 2003/15527 |

(Continued)

OTHER PUBLICATIONS

International Search Report of PCT/KR2020/001909, May 21, 2020, English translation.

*Primary Examiner* — Sunil K Singh
*Assistant Examiner* — Michael Vitale
(74) *Attorney, Agent, or Firm* — STIP Law Group, LLC

(57) ABSTRACT

The present disclosure relates to a tool magazine of a machine tool such as a moving column-type machining center, in which a magazine unit is installed on a saddle, a tool accommodated in a gripper part of the magazine unit is loaded or unloaded in a direction perpendicular to a tool axis, and a gripping part of a change arm directly grips a flange portion of the tool at the time of changing the tools by means of a tool changing part movably installed on the saddle and a tool changing part transfer part configured to move the tool changing part independently of a column, thereby reducing tool change time, improving productivity, minimizing a collision or mechanical interference, and improving stability and reliability in the medium-sized or large-sized machine tool having a length in a width direction.

10 Claims, 18 Drawing Sheets

(52) U.S. Cl.
CPC ............ *B23Q 3/15766* (2013.01); *B23Q 2003/15527* (2016.11); *B23Q 2003/155418* (2016.11); *B23Q 2003/155446* (2016.11); *Y10T 483/1767* (2015.01); *Y10T 483/1786* (2015.01); *Y10T 483/1809* (2015.01); *Y10T 483/1891* (2015.01)

(58) Field of Classification Search
CPC ....... B23Q 2003/155414; B23Q 2003/155418; B23Q 2003/155425; B23Q 2003/155428; B23Q 2003/155435; B23Q 2003/155439; B23Q 2003/155446; B23Q 2003/155449; Y10T 483/1748; Y10T 483/1752–1771; Y10T 483/1776; Y10T 483/1779; Y10T 483/1783–1788; Y10T 483/1809; Y10T 483/1818–1836; Y10T 483/1891
USPC .... 483/36, 38–46, 48, 49, 51–53, 59–62, 68
See application file for complete search history.

(56) References Cited

U.S. PATENT DOCUMENTS

| | | | |
|---|---|---|---|
| 7,322,916 B2 * | 1/2008 | Hazeyama | B23Q 3/1572 483/68 |
| 9,061,386 B2 * | 6/2015 | Tullmann | B23Q 37/002 |
| 9,789,576 B2 * | 10/2017 | Lechleiter | B23B 31/263 |
| 2010/0173762 A1 * | 7/2010 | Tullmann | B23Q 3/15766 74/820 |
| 2013/0095988 A1 * | 4/2013 | Mayr | B23Q 1/601 483/49 |
| 2022/0080543 A1 * | 3/2022 | Moriguchi | B23Q 3/15773 |

FOREIGN PATENT DOCUMENTS

| | | | | |
|---|---|---|---|---|
| EP | 2881219 A1 | 6/2015 | | |
| JP | 2000326171 A | 11/2000 | | |
| JP | 2007098504 A | 4/2007 | | |
| JP | 2010125596 A | 6/2010 | | |
| KR | 20140080767 A | * | 7/2014 | ......... B23Q 3/1554 |

* cited by examiner

TOOL MAGAZINE

CROSS-REFERENCE TO RELATED APPLICATIONS

This application is the U.S. National Phase under 35 U.S.C. § 371 of International Application No. PCT/KR2020/001909 filed on Feb. 11, 2020, which in turn claims the benefit of Korean Application No. 10-2019-0015773 filed on Feb. 11, 2019, the disclosures of which are incorporated by reference into the present application.

FIELD OF THE DISCLOSURE

The present disclosure relates to a tool magazine of a machine tool, and more particularly, to a tool magazine of a machine tool such as a moving column-type machining center, in which a magazine unit is installed on a saddle, and a tool accommodated in a gripper part of the magazine unit is loaded or unloaded in a direction perpendicular to a tool axis at the time of changing the tools by means of a tool changing part movably installed on the saddle and a tool changing part transfer part configured to move the tool changing part independently of a column, thereby reducing tool change time and improving productivity.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of processing such as turning, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a main shaft coupled to a tool or the workpiece and configured to be rotated, and a tailstock and a steady rest configured to support the workpiece during the machining process.

In general, the machine tool is provided with a transfer unit configured to transfer the table, a tool post, the main shaft, the tailstock, and the steady rest along a transfer shaft in order to perform various types of machining.

Further, the machine tool generally uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

Further, the machine tool is generally equipped with an automatic palette changer (APC) in order to minimize the non-processing time. The automatic palette changer (APC) automatically changes the palettes between a workpiece machining region and a workpiece loading region. The workpiece may be mounted on the palette.

In addition, the machine tool is equipped with the automatic tool changer (ATC) configured to withdraw a specific tool from the tool magazine or remount the tool on the tool magazine based on an instruction of a numerical control unit in order to improve productivity of the machine tool.

In general, a machining center refers to a machine tool that has the automatic tool changer and changes various types of tools to perform various types of machining that may be performed by lathes, milling machines, drilling machines, boring machines, and the like. The machining center is mainly classified into a horizontal machining center and a vertical machining center in which a spindle is vertically mounted.

The vertical machining center may include a bed, a saddle installed above the bed, a table installed on the saddle and configured to allow a workpiece to be placed on the table, a column vertically mounted behind the bed, a spindle mounted on the column, a power transmission system configured to operate the spindle, and an electronic control system configured to control the operation of the spindle. The vertical machining center may further include an automatic tool changer, and a headstock configured to clamp a tool magazine and a tool.

In the case of a machine tool, particularly, a moving column-type machining center in the related art, the magazine and the automatic tool changer (ATC) are assembled with the bed, which is a fixed body, without a separate transfer system, such that the magazine and the ATC are always fixed to a lateral surface (a left surface or a right surface) of the machine tool.

In order to change the tools, the spindle, which performs the machining operations at various positions, needs to move to the fixed magazine and the fixed ATC to change the tools and then return to the machining positions, which causes problems of an increase in tool change time and non-machining time and a deterioration in productivity.

In addition, these problems are worse in a machine tool in the related art, particularly, a medium-sized or large-sized machine tool in which a stroke in a width direction (X-axis direction) is 2 m or more. That is, in the case in which the stroke in the width direction is as large as 2 m or more, the spindle needs to reciprocate in a long section to the magazine and the ATC fixed to the lateral surface of the machine tool to change the tools, which causes a problem of the risk of interference and collision with the workpiece.

In particular, because a gripper part of a magazine in the related art grips a pull stud with a ball to which a tensile force of a spring is applied, the ATC necessarily moves upward and downward when the ATC returns a tool to the gripper of the magazine and the spindle or when the ATC withdraws the tool. A separate configuration for the upward or downward movement needs to be provided, which complicates the configuration of the ATC, increases a size of the ATC, and finally increases a size of the machine tool.

Moreover, the machine tool in the related art increases in size to reduce the risk of interference and collision, which causes problems of deterioration in spatial utilization, inconvenience caused by the heavy machine tool, and an increase in costs required to manufacture and maintain the machine tool.

Furthermore, in the case of the machine tool in the related art, the ATC needs to not only rotate, but also move upward and downward with respect to the spindle in order to change the tools, which causes problems of increases in size of the ATC, weight of the machine tool, and manufacturing costs.

DISCLOSURE

Summary

The present disclosure has been made in an effort to solve the above-mentioned problems, and an object of the present disclosure is to provide a tool magazine of a machine tool such as a moving column-type machining center, in which a magazine unit is installed on a saddle, a tool accommodated in a gripper part of the magazine unit is loaded or unloaded in a direction perpendicular to a tool axis, and a gripping part of a change arm directly grips a flange portion of the tool at the time of changing the tools by means of a tool changing part movably installed on the saddle and a tool changing part transfer part configured to move the tool changing part independently of a column, thereby reducing tool change time, improving productivity, minimizing a collision or mechanical interference, and improving stability and reliability in the medium-sized or large-sized machine tool having a length in a width direction.

In order to achieve the above-mentioned objects, the present disclosure provides a tool magazine of a machine tool, the tool magazine including: a magazine unit having a plurality of gripper parts configured to accommodate tools to supply the tools to a spindle, each of the gripper parts being configured to store the tool, and the magazine unit being installed on a saddle so as to move together with the saddle when the saddle moves; and a tool changing part movably installed on the saddle to replace a tool mounted on the spindle with a tool accommodated in the gripper part of the magazine unit, in which the tool is loaded or unloaded to/from the gripper part of the magazine unit in a direction perpendicular to a tool axis.

In another exemplary embodiment of the tool magazine of the machine tool according to the present disclosure, the tool changing part may have a change arm configured to grip the tool accommodated in the gripper part of the magazine unit or mounted on the spindle, and the gripping part of the change arm may directly grip a flange portion of the tool by a rectilinear movement of the tool changing part.

In another exemplary embodiment of the tool magazine of the machine tool according to the present disclosure, the gripper parts of the magazine unit each may clamp the tool while avoiding a flange portion of each of the tools accommodated in the gripper part.

In another exemplary embodiment of the tool magazine of the machine tool according to the present disclosure, the magazine unit may include: a main frame; a support frame configured to couple the main frame to the saddle; a motor part installed on the main frame or the support frame and configured to generate rotational power; a link part installed to be movable along the main frame by the rotational power of the motor part; the plurality of gripper parts mounted on the link part and configured to accommodate the tools; and a release part installed on the main frame so as to be adjacent to a standby position and configured to unclamp a standby tool accommodated in the gripper part positioned at the standby position.

In another exemplary embodiment of the tool magazine of the machine tool according to the present disclosure, the gripper part may include: a fixing part coupled to the link part; a moving part installed on the fixing part so as to be movable upward and downward; a handle part configured to move the moving part upward or downward by an operation of the release part; guide shaft parts installed on the moving part so as to be parallel to each other while facing each other based on the handle part; and a pressing part installed on the moving part and configured to press the accommodated tool to clamp the tool.

In another exemplary embodiment of the tool magazine of the machine tool according to the present disclosure, the release part may include: a cylinder provided on the main frame; a piston installed in the cylinder and configured to reciprocate upward or downward; and a hanging part installed at a tip of the piston and configured to move the handle part upward or downward in conjunction with the upward or downward movement of the piston.

In another exemplary embodiment of the tool magazine of the machine tool according to the present disclosure, the hanging part of the release part may include catching projection portions bent inward from two opposite sides of a lower tip of the hanging part.

In another exemplary embodiment of the tool magazine of the machine tool according to the present disclosure, the handle part of the gripper part of the magazine unit may include a stopper portion provided on a lower portion of the handle part, and the stopper portion may be configured to come into contact with a stepped portion of the moving part to move the moving part upward when the piston is moved upward and a head portion of the handle part is moved upward by the catching projection portion.

In another exemplary embodiment of the tool magazine of the machine tool according to the present disclosure, when the gripper part of the magazine unit clamps the tool, a lower portion of the head portion of the handle part may be spaced apart from the catching projection portion, and an upper portion of the head portion of the handle part may be spaced apart from the catching portion.

In another exemplary embodiment of the tool magazine of the machine tool according to the present disclosure, the guide shaft part of the gripper part of the magazine unit may include an elastic member installed on a lower portion of the guide shaft part and configured to press the moving part downward so that the moving part comes into contact with the fixing part when the gripper part clamps the tool.

In another exemplary embodiment of the tool magazine of the machine tool according to the present disclosure, the fixing part of the gripper part of the magazine unit may include: a finger portion configured to support a lower portion of the flange portion of the tool; and a key protruding at an upper side of the finger portion.

In another exemplary embodiment of the tool magazine of the machine tool according to the present disclosure, the pressing part of the gripper part of the magazine unit may include: a close-contact portion tapered to be in contact with a tapered surface of a shank portion of the tool; and a support portion protruding and configured to clamp the tool by coming into contact with a circumferential surface of the shank portion of the tool.

In another exemplary embodiment of the tool magazine of the machine tool according to the present disclosure, the close-contact portion of the pressing part of the gripper part of the magazine unit may have a gradient corresponding to a gradient of a tapered surface of the shank portion.

In another exemplary embodiment of the tool magazine of the machine tool according to the present disclosure, the tool magazine may include: a bed; a table installed on the bed and configured to allow a workpiece to be seated thereon; a saddle movably installed on the bed; a column movably installed on the saddle; and a spindle movably installed on the column and configured to machine the workpiece.

In another exemplary embodiment of the tool magazine of the machine tool according to the present disclosure, the tool magazine may further include: a transfer part configured to move the saddle, the column, and the spindle; and a tool changing part transfer part installed on the saddle and configured to move the tool changing part over the saddle independently of the transfer part.

According to the tool magazine of the machine tool according to the present disclosure, the magazine unit is installed on the saddle, and the gripper part clamps the tool while avoiding the flange portion of the tool so that the tool accommodated in the gripper part of the magazine unit is loaded or unloaded in the direction perpendicular to the tool axis at the time of changing the tools, by the tool changing part movably installed on the saddle and the tool changing part transfer part configured to move the tool changing part independently of the column. With the structure in which the gripping part of the change arm directly grips the flange portion of the tool, the tool changing part may quickly change the tools between the spindle and the gripper part of the magazine unit simply by be rectilinearly reciprocated by the tool changing part transfer part. Therefore, it is possible to reduce the tool change time and maximize the productivity.

In addition, it is possible to quickly change the tools, minimize the movement time for changing the tools in the medium-sized or large-sized machine tool having a long length in the width direction, automatically change the tools, and maximize the user's convenience.

Moreover, the tool magazine of the machine tool according to the present disclosure may reduce the likelihood of interference or collision by minimizing the movement distance required to change the tools, thereby improving the stability and reliability of the machine tool.

Moreover, according to the tool magazine of the machine tool according to the present disclosure, the respective constituent components including the magazine unit and the tool changing part may be small in size, and the entire machine tool may be small in size and light in weight, such that the spatial utilization may be maximized, and the maintenance and manufacturing costs are reduced.

Furthermore, according to the tool magazine of the machine tool according to the present disclosure, the tool changing part only rectilinearly reciprocates and rotates, and the spindle performs an inherent function of moving upward and downward in the height direction to change the tools. Therefore, the tool changing part may be small in size, and the tool changing part may quickly move, thereby reducing the non-machining time, reducing vibration and noise generated while the machine tool moves, increasing the lifespan of the machine tool, and maximizing the machining precision.

DESCRIPTION OF MAIN REFERENCE NUMERALS OF DRAWINGS

Figure 1:
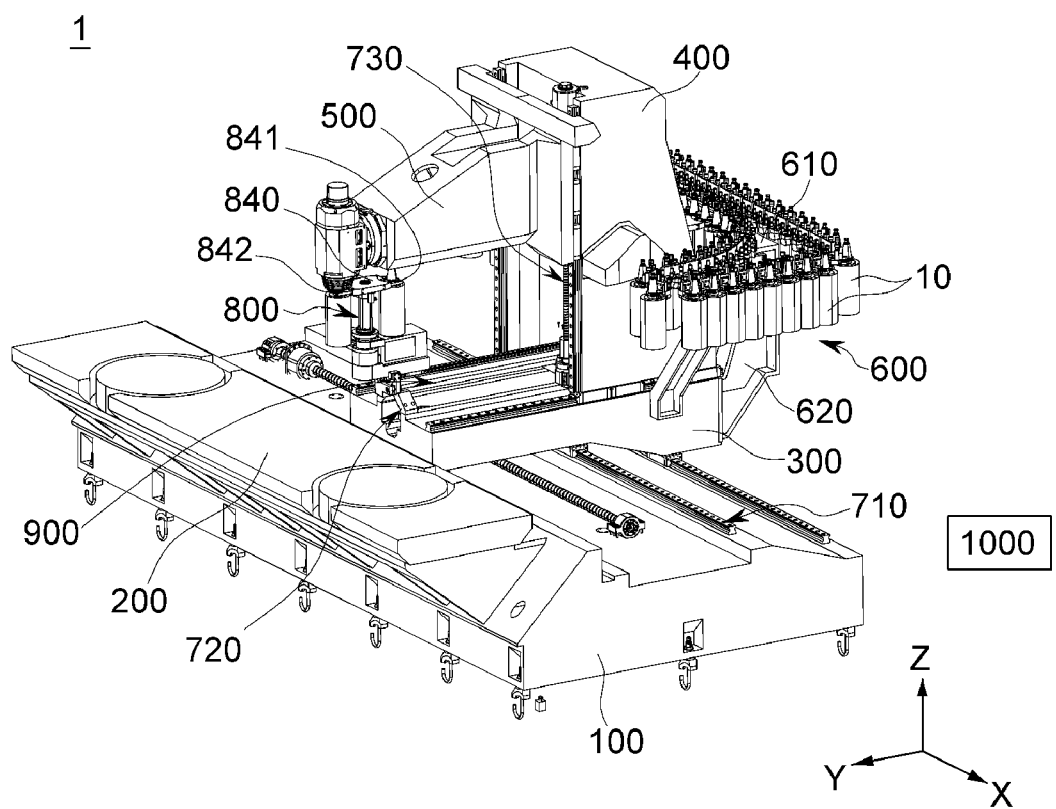
FIG. 1 and FIG. 2 are perspective views of a tool magazine of a machine tool according to an embodiment of the present disclosure.

1: Machine tool
2: Processing tool
3: Standby tool
10: Tool
11: Pull stud
12: Shank portion
13: Tapered surface
14: Flange portion
100: Bed
200: Table
300: Saddle
400: Column
500: Spindle
600: Magazine unit
610: Main frame
620: Support frame
630: Motor part
640: Link part
650: Gripper part
660: Release part
700: Transfer part
710: Saddle transfer part
720: Column transfer part
730: Spindle transfer part
800: Tool changing part
900: Tool changing part transfer part
1000: Control part

DETAILED DESCRIPTION OF CERTAIN INVENTIVE EMBODIMENT

Hereinafter, a tool magazine for a machine tool according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present invention is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 2:
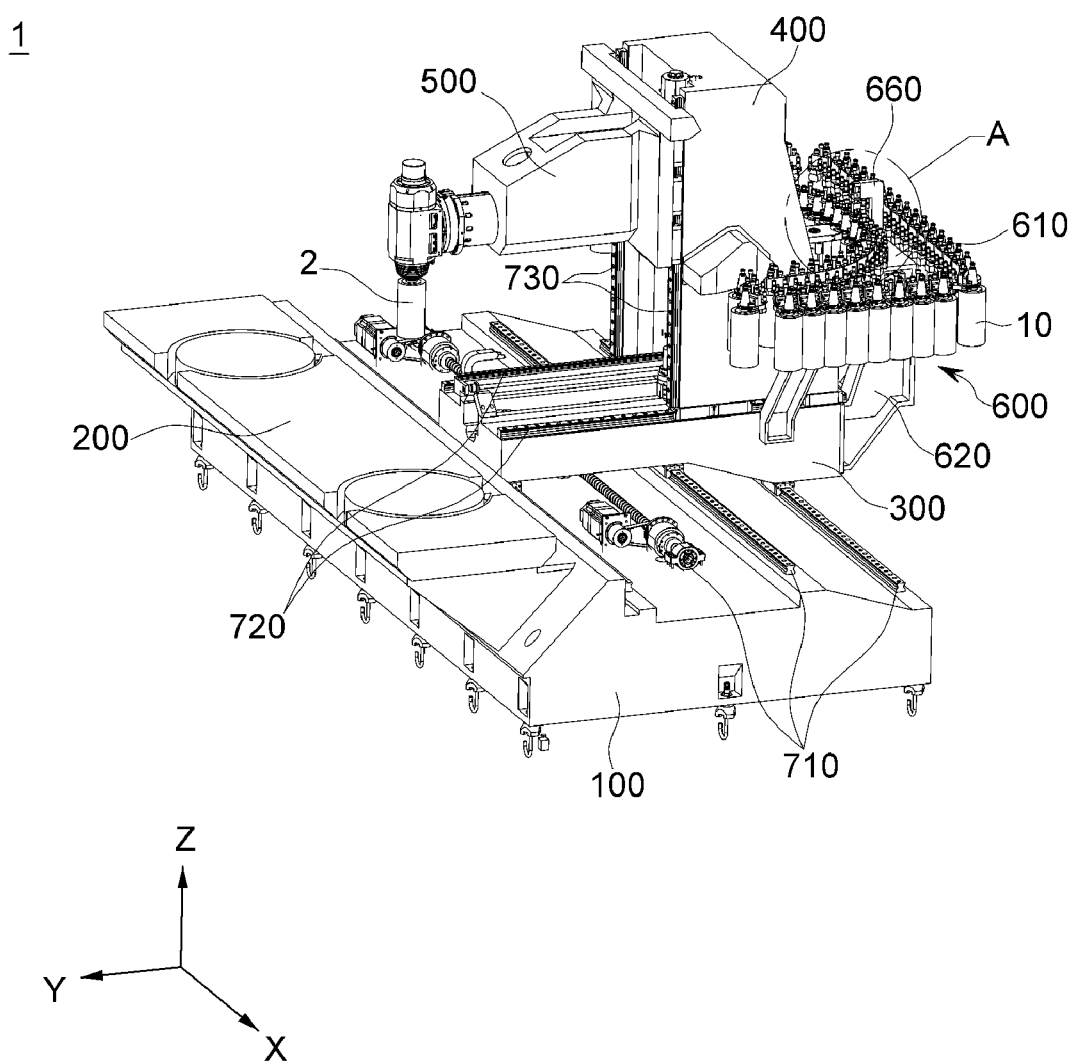
Figure 3:
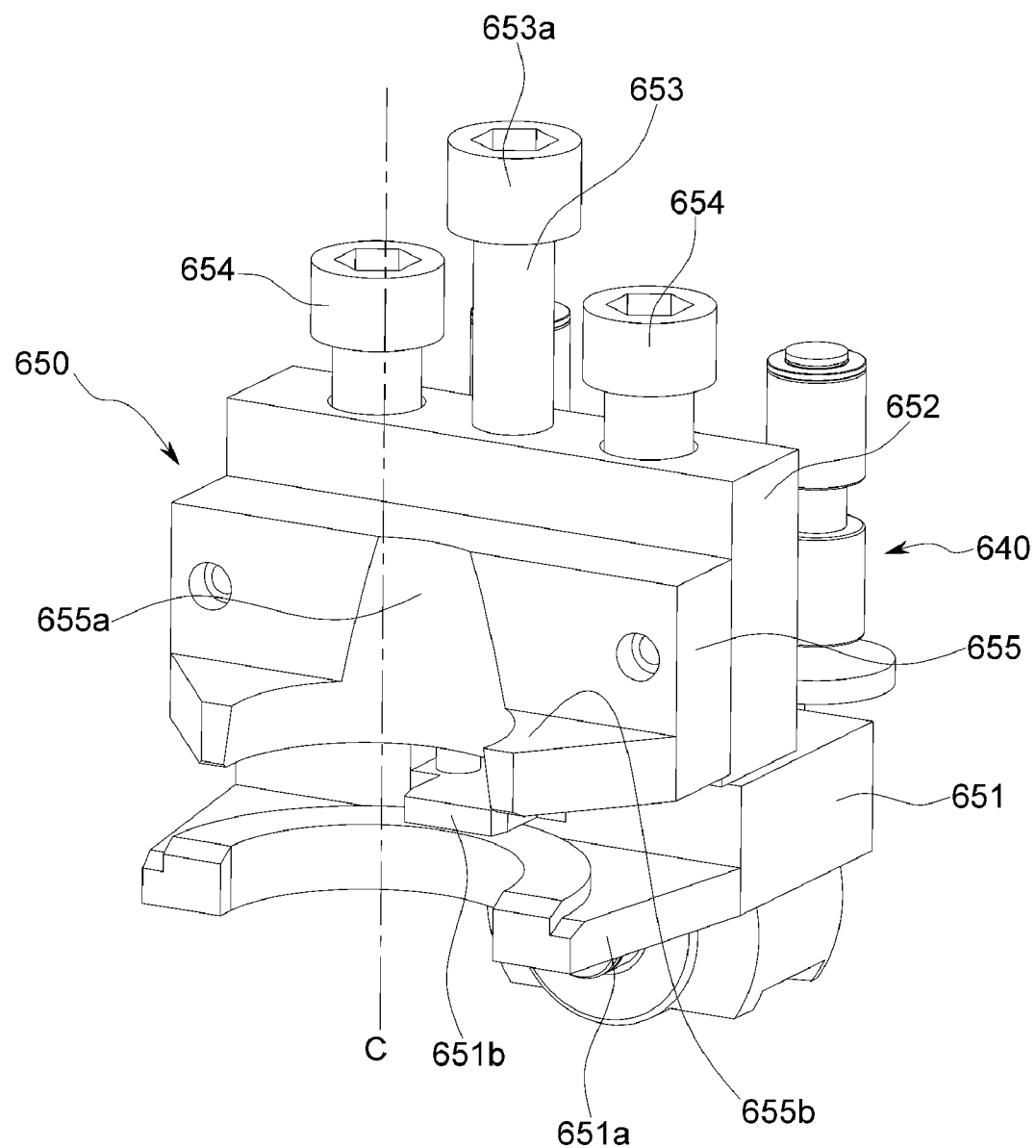
FIG. 3 is a perspective view illustrating a link part and a gripper part of a magazine unit of the tool magazine of the machine tool according to the embodiment of the present disclosure.
Figure 4:
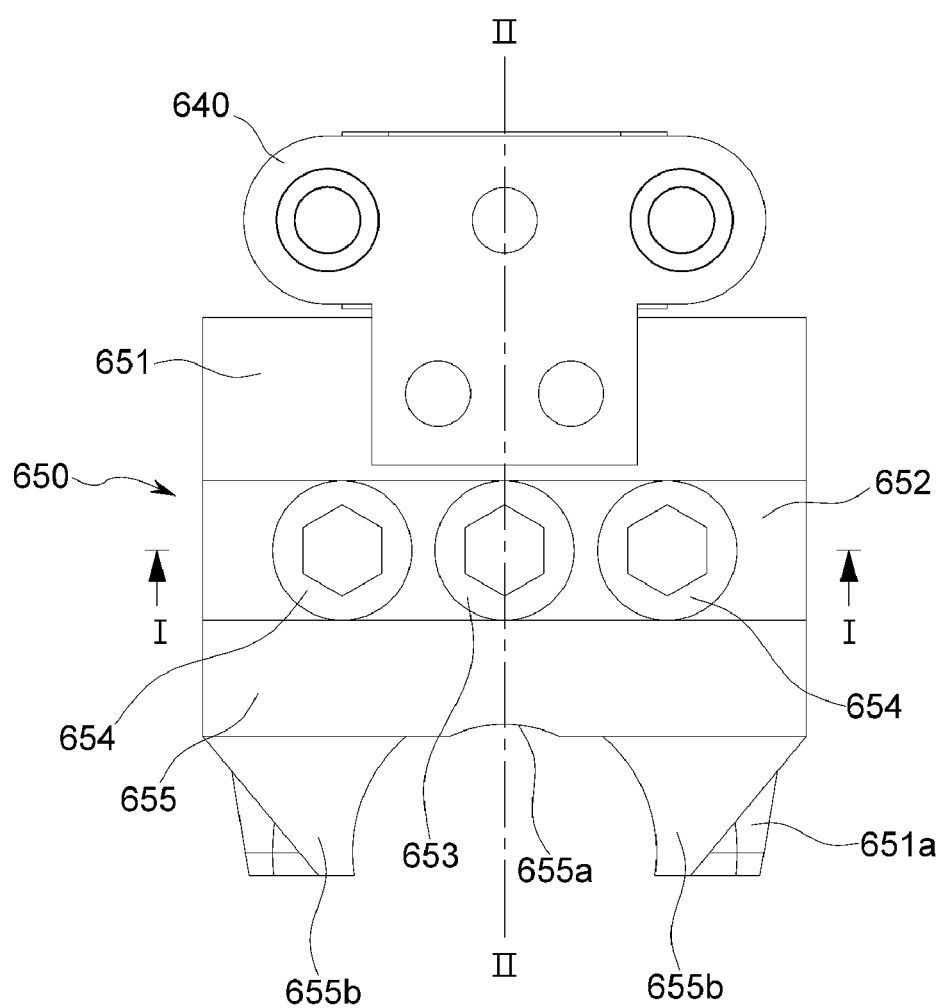
FIG. 4 is a top plan view illustrating the link part and the gripper part illustrated in FIG. 3.
Figure 5:
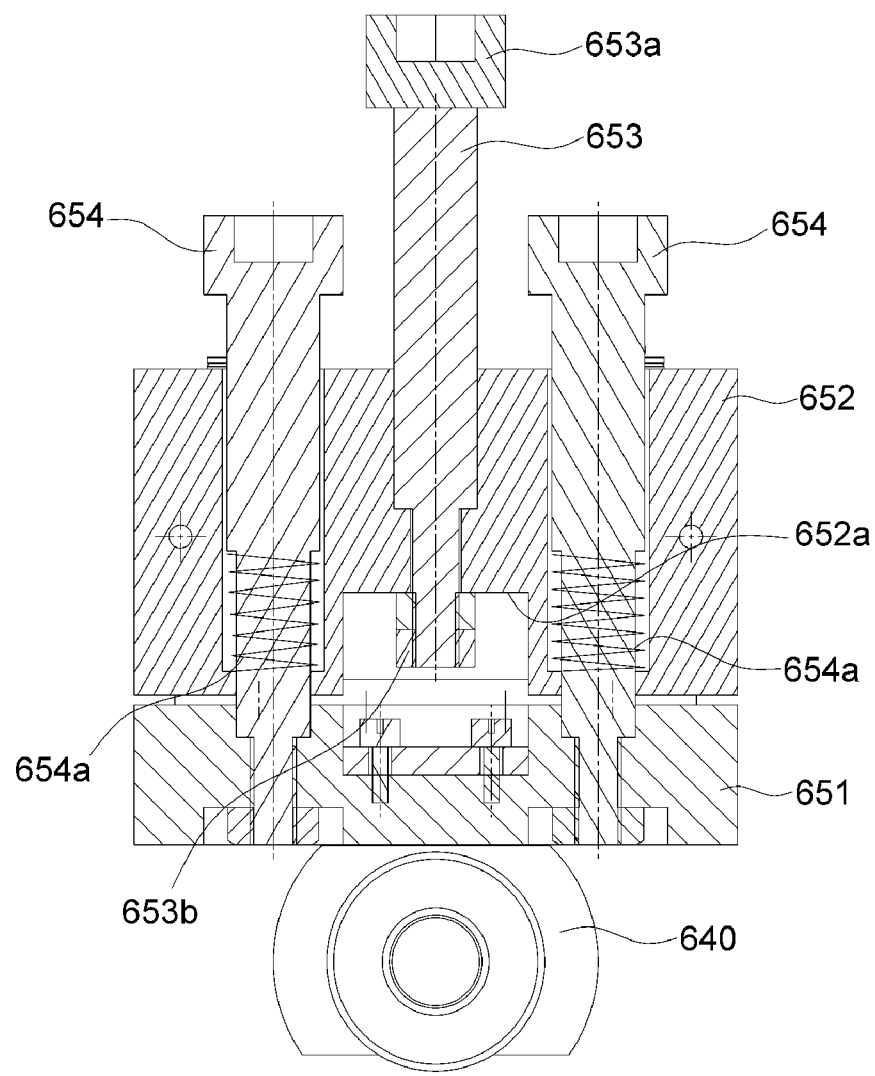
FIG. 5 is a cross-sectional view taken along line I-I in FIG. 4.
Figure 6:
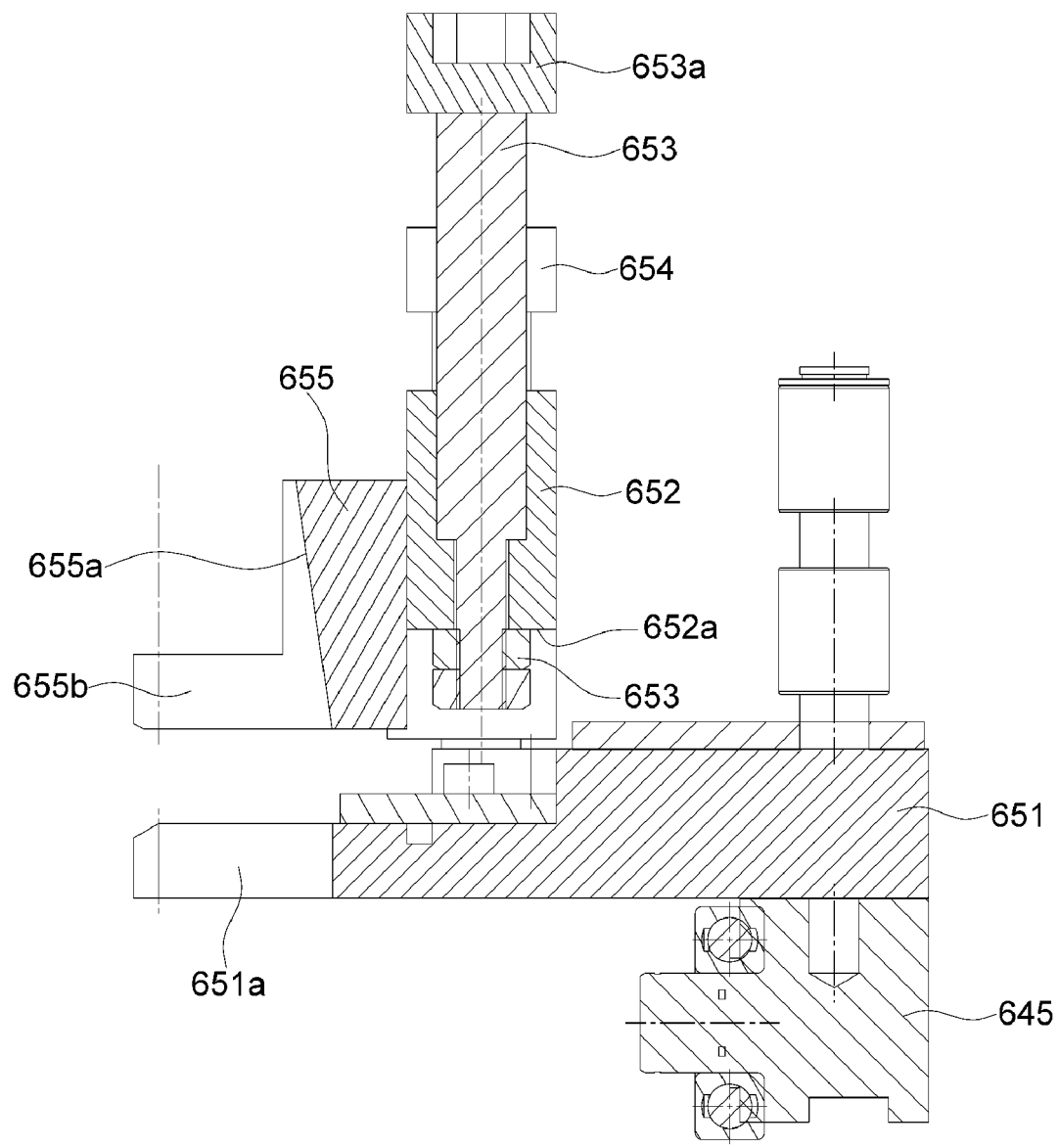
FIG. 6 is a cross-sectional view taken along line II-II in FIG. 4.
Figure 7:
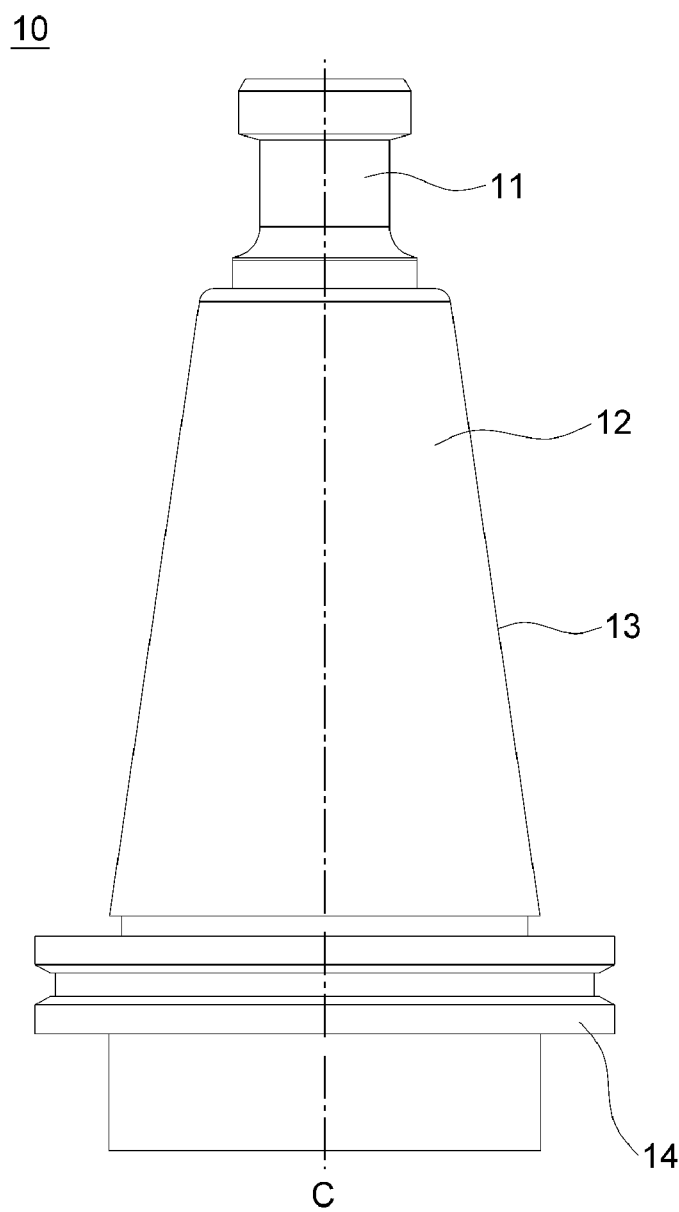
FIG. 7 is a conceptual view illustrating a tool mounted on the gripper part of the magazine unit of the tool magazine of the machine tool according to the embodiment of the present disclosure.
Figure 8:
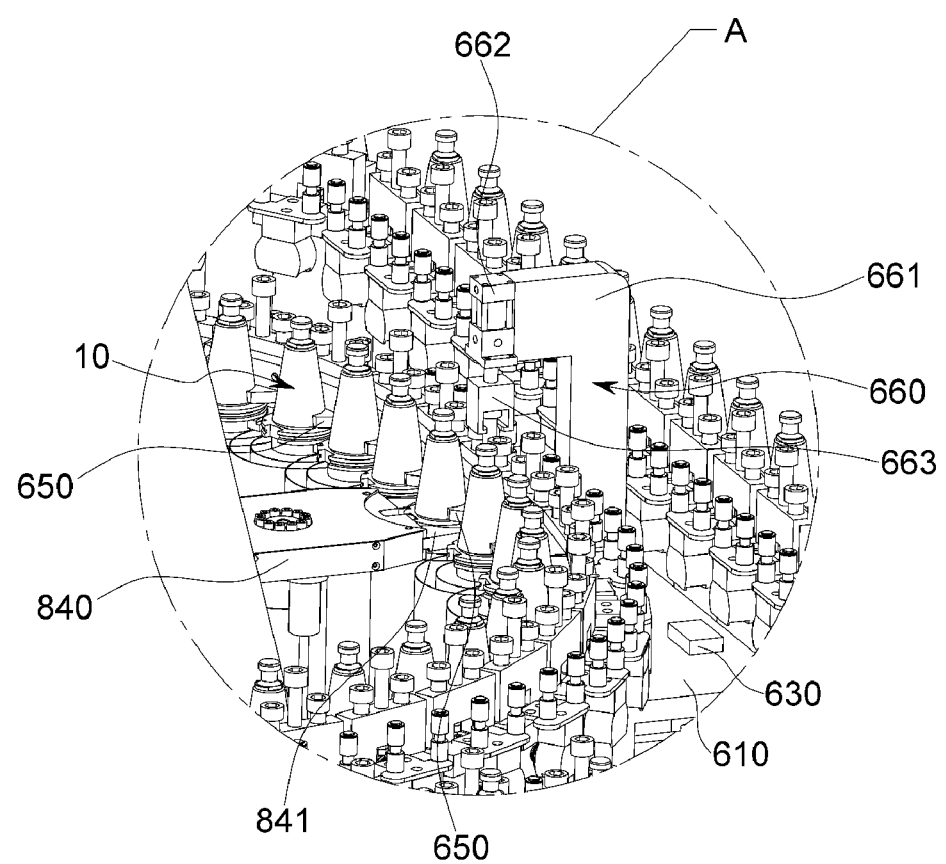
FIG. 8 is an enlarged view of part A in FIG. 2.
Figure 9:
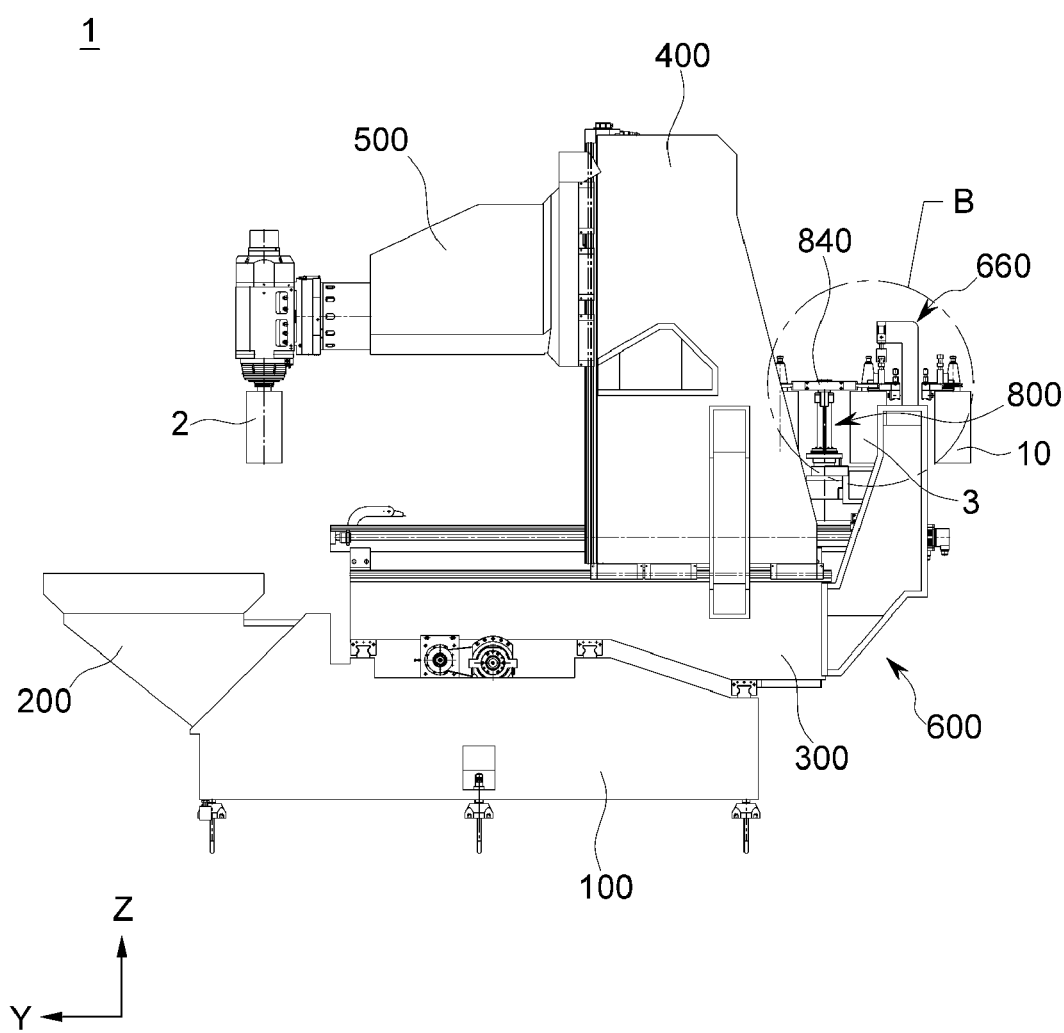
FIG. 9, FIG. 12, FIG. 14, and FIG. 16, FIG. 17, FIG. 18 are conceptual views illustrating a process of operating the tool magazine of the machine tool according to the embodiment of the present disclosure.
Figure 10:
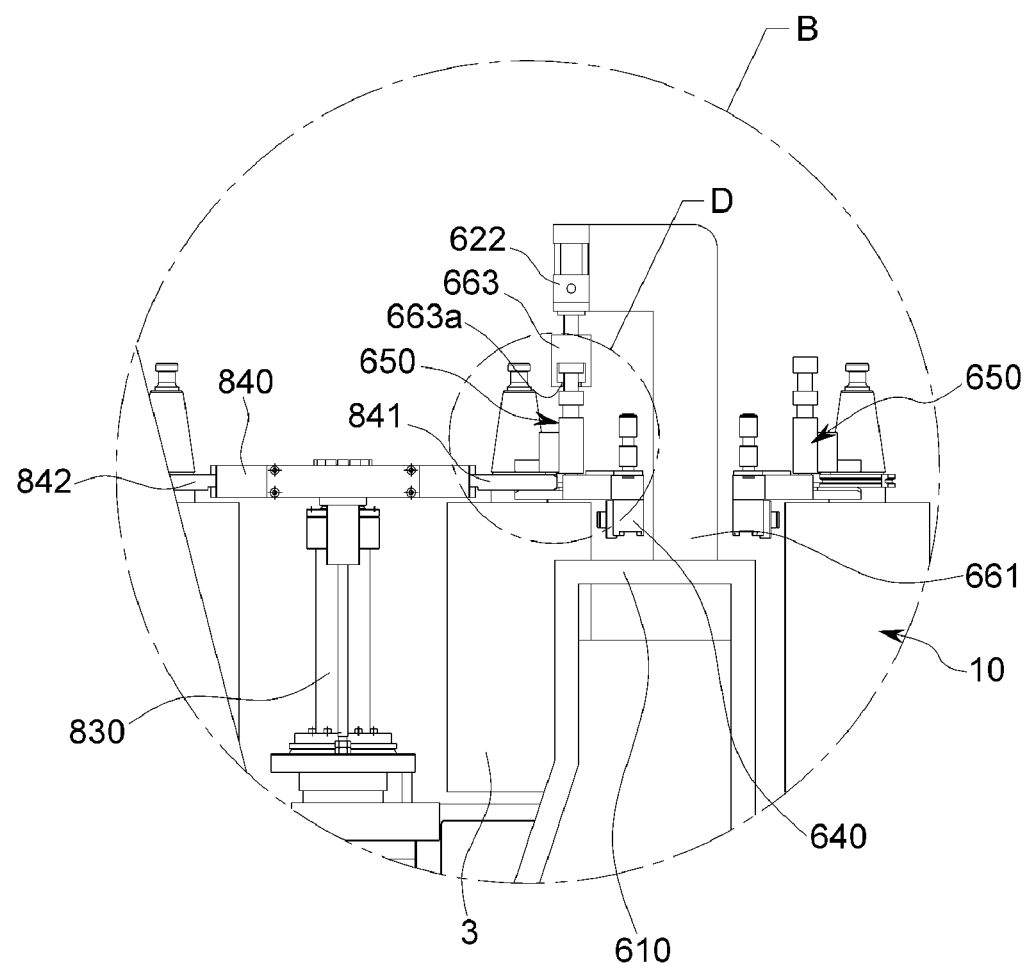
FIG. 10 is an enlarged view of part B in FIG. 9.
Figure 11:
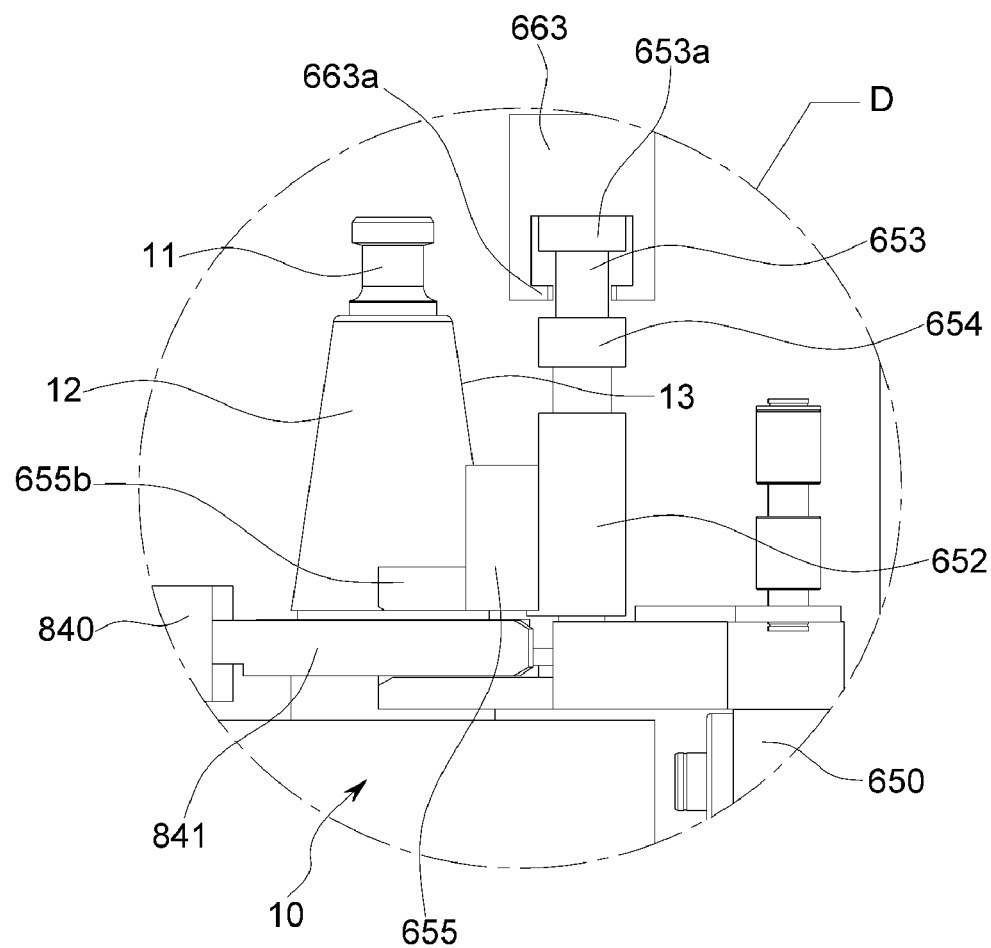
FIG. 11 is an enlarged view of part D in FIG. 10.
Figure 15:
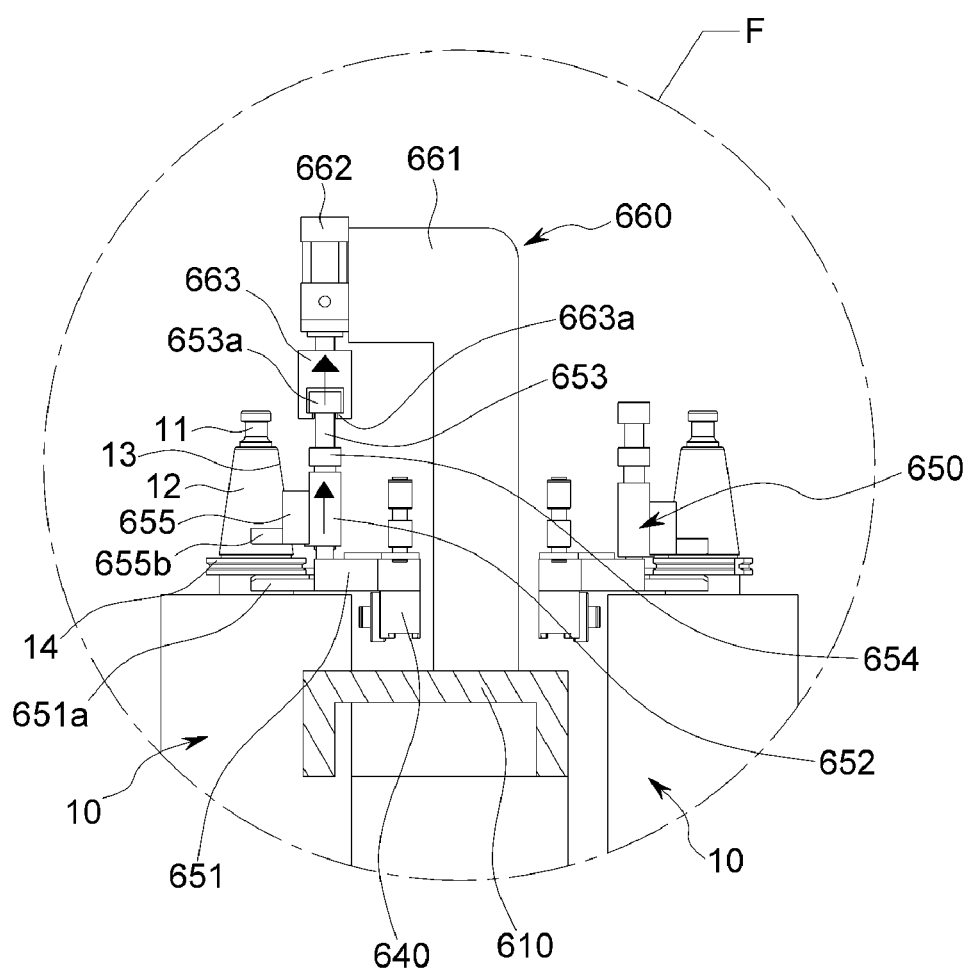
FIG. 15 is an enlarged view of part F in FIG. 14.
Figure 16:
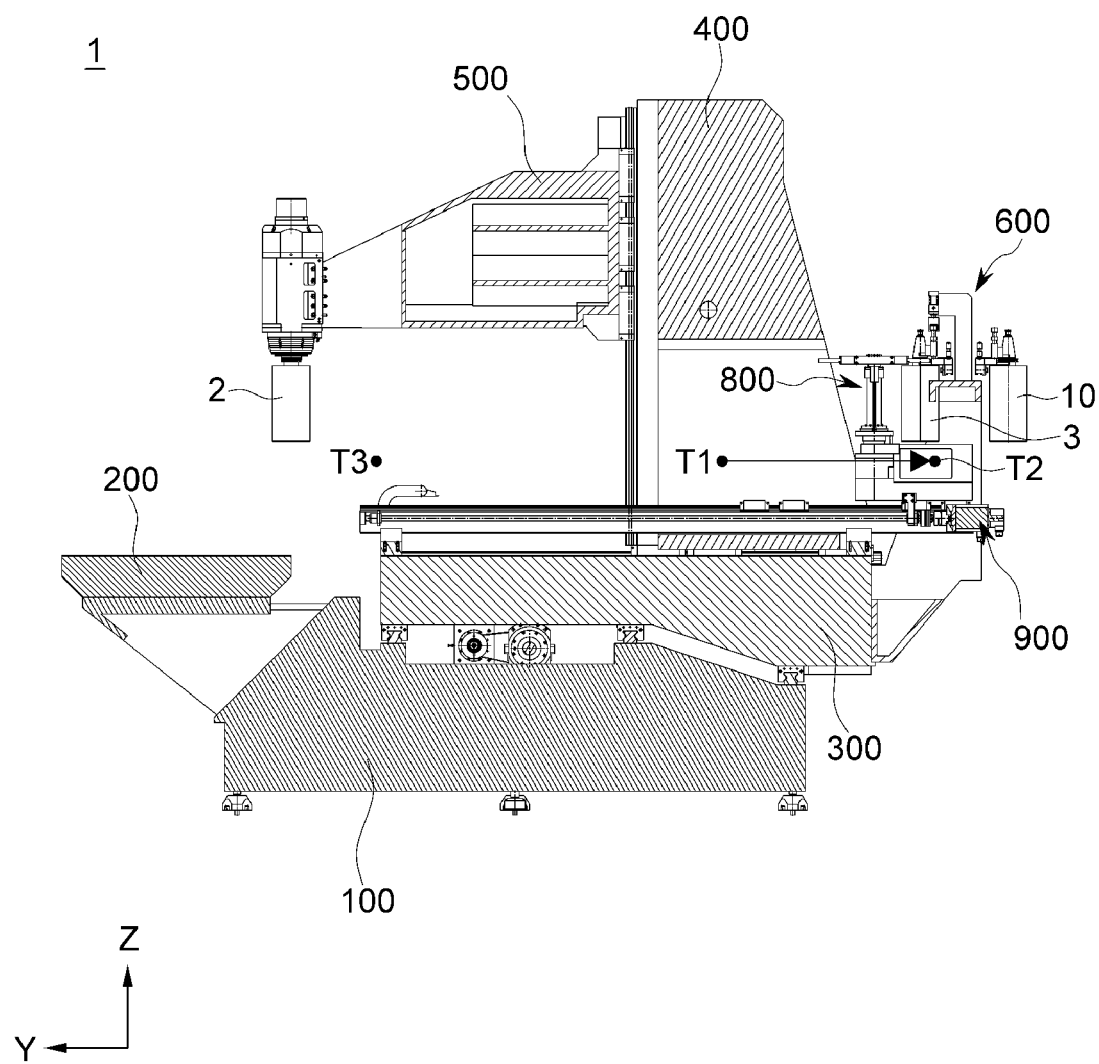

FIGS. 1 and 2 are perspective views of a tool magazine of a machine tool according to an embodiment of the present disclosure, and FIG. 3 is a perspective view illustrating a link part and a gripper part of a magazine unit of the tool magazine of the machine tool according to the embodiment of the present disclosure. FIG. 4 is a top plan view illustrating the link part and the gripper part illustrated in FIG. 3. FIG. 5 is a cross-sectional view taken along line I-I in FIG. 4, and FIG. 6 is a cross-sectional view taken along line II-II in FIG. 4. FIG. 7 is a conceptual view illustrating a tool mounted on the gripper part of the magazine unit of the tool magazine of the machine tool according to the embodiment of the present disclosure. FIG. 8 is an enlarged view of part A in FIG. 2. FIGS. 9, 12, 14, and 16 to 18 are conceptual views illustrating a process of operating the tool magazine of the machine tool according to the embodiment of the present disclosure. FIG. 10 is an enlarged view of part B in FIG. 9. FIG. 11 is an enlarged view of part D in FIG. 10. FIG. 13 is an enlarged view of part E in FIG. 12. FIG. 15 is an enlarged view of part F in FIG. 14.

The terms used below are defined as follows. The term "width direction" means a horizontal direction on the same member, i.e., an X-axis direction in FIGS. 1 to 18, the term "longitudinal direction" means a vertical direction on the same member, i.e., a Y-axis direction in FIGS. 1 to 18 orthogonal to the width direction, and the term "height direction" means an upward/downward direction on the same member, i.e., a Z-axis direction in FIGS. 1 to 18 orthogonal to the width direction and the longitudinal direction. In addition, the term "upward (upper)" means an upward direction in the "height direction," i.e., a direction toward an upper side in the Z-axis direction in FIGS. 1 to 18, and the term "downward (lower)" means a downward direction in the "height direction," i.e., a direction toward a lower side in the Z-axis direction in FIGS. 1 to 15. In addition, the term "upward movement" means a movement toward an upper side in the Z-axis direction, which is the height direction in FIGS. 1 to 18, and the term "downward direction" means a movement toward a lower side in the Z-axis direction, which is the height direction in FIGS. 1 to 18. In addition, the term "inward (inner)" means a side relatively close to a center of the same member, i.e., the inside in FIGS. 1 to 14, and the term "outward (outer)" means a side relatively distant from the center of the same member, i.e., the outside in FIGS. 1 to 14. In addition, the term "forward (front)" means a side close to a table, and the term "rearward (rear)" means a side close to a magazine.

A tool magazine 1 of a machine tool according to an embodiment of the present disclosure will be described with reference to FIGS. 1 to 18. As illustrated in FIGS. 1 to 2, the tool magazine 1 of the machine tool according to the embodiment of the present disclosure includes a magazine unit 600 and a tool changing part 800.

As illustrated in FIGS. 1 to 2, the tool magazine 1 of the machine tool according to another embodiment of the present disclosure may further include a bed 100, a table 200, a saddle 300, a column 400, a spindle 500, a transfer part 700, a tool changing part transfer part 900, and a control part 1000.

The bed 100 is installed on a ground surface or a base. The bed 100 serves as a support for supporting a workpiece to be machined and provides a space in which components required to machine the workpiece are installed.

The table 200 is installed on an upper portion of the bed 100, and the workpiece is seated on the table 200. The table 200 may be provided as a stationary or rotary table, but the present disclosure is not necessarily limited thereto. That is, the table 200 may rotate and move in a vertical direction, a horizontal direction, and a height direction on the upper portion of the bed 100, as necessary.

The bed 100 and the table 200 may be provided to have a stroke of 2 m or more in a width direction.

The saddle 300 is movably installed on the upper portion of the bed 100. The saddle 300 is installed on the upper portion of the bed 100 so as to be adjacent to the table 200. In addition, as illustrated in FIGS. 1 and 2, the saddle 300 may be moved in the width direction (X-axis direction) on the upper portion of the bed 100 by the transfer part 700, i.e., a saddle transfer part 710 installed on the bed 100. In addition, the saddle 300 is disposed on the upper portion of the bed 100 and serves to support the column 400.

The column 400 is movably installed on an upper portion of the saddle 300. The column 400 is installed above the saddle 300 in the height direction, but the present disclosure is not necessarily limited thereto. That is, as illustrated in FIGS. 1 and 2, the column 400 may move in a longitudinal direction (Y-axis direction) on the upper portion of the saddle 300 by the transfer part 700, i.e., a column transfer part 720 installed on the saddle 300.

The spindle 500 is movably installed on the column 400 and rotates a processing tool 2 clamped to machine the workpiece. That is, as illustrated in FIGS. 1 and 2, the spindle 500 may move in the height direction (Z-axis direction) along one side of the column 400 by the transfer part 700, i.e., a spindle transfer part 730 installed on the column 400. Specifically, the spindle 500 may be configured as a spindle head on which a Z-axis slide and a main shaft are mounted to be movable in the height direction along the column 400.

The magazine unit 600 accommodates a plurality of tools and supplies the spindle with the tool most suitable for the machining operation in accordance with a machining program or a machining state of the machine tool or an operator. That is, the magazine unit 600 has a plurality of gripper parts 650 capable of accommodating tools 10 and supplying standby tools 3 to the spindle 500. The gripper parts 650 each store the corresponding tool 10. As illustrated in FIG. 8, the gripper part 630 is connected to a link part 640, and the link part 640 is rotated along a main frame 610 of the magazine unit 600 by an operation of a motor part 630 installed on the main frame 610 or a support frame 620.

As illustrated in FIGS. 1 and 2, the magazine unit 600 is installed on the saddle 300 by the support frame 620 and moves in the X-axis direction together with the saddle 300 when the saddle 300 is moved in the X-axis direction by the saddle transfer part 710.

The transfer part 700 serves to move the saddle 300, the column 400, and the spindle 500. As illustrated in FIGS. 1 and 2, the transfer part 700 includes the saddle transfer part 710, the column transfer part 720, and the spindle transfer part 730.

The saddle transfer part 710 is installed on the bed 100 to move the saddle 300. The column transfer part 720 is installed on the upper portion of the saddle 300 to move the column 400. The spindle transfer part 730 is installed at one side of the column 400 to move the spindle 500. The transfer part 700 includes an LM guide, a ball screw, and a motor.

The tool changing part 800 is movably installed on the saddle 300 to replace the processing tool 2 mounted on the spindle 500 with the standby tool 3 which is to be used for a subsequent process among the tools 10 accommodated in the gripper parts 650 of the magazine unit 600.

As illustrated in FIGS. 8 to 18, the tool changing part 800 of the tool magazine 1 of the machine tool according to the embodiment of the present disclosure includes a base part, a power part, a shaft part 830, and a change arm 840.

The base part is installed to be movable in the longitudinal direction (X-axis direction) above the saddle along the linear guide of the tool changing part transfer part by a linear guide block and a bracket part of the tool changing part transfer part.

The power part is installed in the base part and generates rotational power. The power part may include a servo motor, but the present disclosure is not necessarily limited thereto.

The shaft part 830 is rotated by the rotational power from the power part.

The change arm 840 is installed at one side of the shaft part 830 so as to be rotatable in conjunction with the shaft part. In addition, the change arm 840 rectilinearly moves in the longitudinal direction (Y-axis direction) above the saddle 300 and grips the standby tool 3 accommodated in the gripper part 650 of the magazine unit 600, the processing tool 2 mounted on the spindle 500, or the corresponding tool 10.

In addition, the change arm 840 has a first gripping part 841 and a second gripping part 842 installed to face each other and disposed at two opposite ends of the change arm 840. The first gripping part 841 serves to accommodate the standby tool 3, and the second gripping part 842 serves to grip the processing tool. That is, as the change arm 840 is simply moved rectilinearly in the longitudinal direction (Y-axis direction) above the saddle 300 by the tool changing unit transfer part 900, the first gripping part 841 of the change arm 840 accommodates the standby tool 3, and the second gripping part 842 grips the processing tool 2.

That is, the first gripping part and the second gripping part of the change arm each directly grip a flange portion 14 of the tool 10 as the tool changing part rectilinearly moves. Therefore, as the change arm 840 is simply moved rectilinearly in the longitudinal direction (Y-axis direction) above the saddle 300 by the tool changing unit transfer part 900, the first gripping part 841 of the change arm 840 accommodates the standby tool 3, and the second gripping part 842 grips the processing tool 2.

The tool changing part transfer part 900 is installed on the saddle 300 to move the tool changing part 800 in the longitudinal direction (Y-axis direction) over the saddle 300. As described above, the tool changing part transfer part 900 is provided on the saddle 300 and includes a ball screw, a linear guide, a linear guide block, a drive unit, and a coupling.

The tool changing part transfer part 900 may move the tool changing part 800 over the saddle 300 through the column 400 independently of the column transfer part 720 for moving the column 400. The tool changing part transfer part 900 may freely and rectilinearly reciprocate the tool changing part 800 between an initial position T1 defined above the saddle 300 between the saddle 300 and the column 400, a standby position T2 adjacent to a standby port of the magazine unit 600, and a change position T3 adjacent to the spindle.

That is, since the tool changing part 800 may be rectilinearly reciprocated in the longitudinal direction (Y-axis direction) by the tool changing part transfer part 900 independently of the column 400, the spindle 500 may move independently of the column 400 to change the tools, thereby quickly and conveniently changing the tools without unnecessarily moving the spindle 500 coupled to the column 400.

The control part 1000 controls the operations of the magazine unit 600, the tool changing part 800, the tool changing part transfer part 900, the saddle transfer part 710, and the transfer part 700 including the column transfer part 720 and the spindle transfer part 730 in order to replace the processing tool 2 mounted on the spindle 500 with the tool accommodated in the gripper part 650 of the magazine unit 600 or the standby tool 3 to be used for a subsequent process.

The gripper part 650 of the magazine unit 600 clamps the tool while avoiding the flange portion 14 of the tool accommodated in the gripper part 650 so that the tool 10 is loaded or unloaded in a direction perpendicular to a tool axis C. In contrast, the gripping parts 841 and 842 of the change arm 840 each directly grips the flange portion 14 of the tool as the tool changing part rectilinearly moves.

That is, as illustrated in FIGS. 9 to 19, in order to replace the processing tool 2 mounted on the spindle 500 with the standby tool 3 accommodated in the gripper part 650 of the magazine unit 600 in the tool magazine 1 of the machine tool according to the embodiment of the present disclosure, the tool changing part 800 only rectilinearly moves in the longitudinal direction (Y-axis direction) above the saddle 300 without moving upward or downward (in the height direction (Z-axis direction)), and the change arm 840 only rotates. The spindle 500 moves upward and downward in the height direction between an upper gripping line and a lower gripping line, such that the processing tool 2 is unclamped from the spindle 500 and the change arm 840 clamps the standby tool 3 accommodated in the first gripping part 841. That is, the upward or downward movement necessarily required to load and unload the tool into/from the spindle may be performed by the spindle instead of the tool changing part. This is implemented by a structure in which the tool is loaded or unloaded into/from the gripper of the magazine in a direction perpendicular to the tool axis. As a result, by the tool changing part movably installed on the saddle and the tool changing part transfer part configured to move the tool changing part independently of the column, the gripper part grips the tool while avoiding the flange portion of the tool so that the standby tool accommodated in the gripper part of the magazine unit is loaded or unloaded in the direction perpendicular to the tool axis at the time of changing the tools. The first or second gripping part of the change arm is structured to directly grip the flange portion of the tool. As a result, it is possible to quickly change the tools at the spindle and the gripper part of the magazine simply by reciprocating the tool changing unit rectilinearly by the tool changing unit transfer part without moving the change arm of the tool changing unit upward and downward.

As described above, since the tool changing part only rectilinearly reciprocates and rotates and the spindle moves upward and downward to load and unload the tool into/from the spindle, a separate configuration for moving the tool changing part upward or downward may be minimized, the tool changing part may be light in weight and have a small size, the entire machine tool may be compact, and the spatial utilization may be maximized. In addition, the reduction in size of the tool changing part enables the tool changing unit to quickly reciprocate between the initial position, the standby position, and the change position, thereby minimizing non-machining time and maximizing productivity.

As illustrated in FIGS. 1 to 18, the magazine unit 600 of the tool magazine 1 of the machine tool according to the embodiment of the present disclosure includes the main frame 610, the support frame 620, the motor part 630, the link part 640, the plurality of gripper parts 650, and a release part 660.

The main frame 610 defines an external shape of the magazine unit 600. The main frame 610 and the support frame 620 may be integrated, as necessary.

The support frame 620 couples the main frame 610 to the saddle 300. That is, the magazine unit 600 is coupled to the saddle 300 by the support frame 620 and may move integrally with the saddle 300.

The motor part 630 is installed on the main frame 610 or the support frame 620 and generates rotational power for rotating and circulating the link part 640. The motor part 630 may include a servo motor.

The link part 640 is installed on the main frame 610 so as to be movable along the main frame 610 by the rotational power of the motor part 630. Although not illustrated in the drawings, the link part 640 may be installed on the main frame and connected to a drive sprocket and an idle sprocket so as to circulate and rotate along the main frame. The link part 640 may have various shapes such as a chain shape.

The plurality of gripper parts 650 is mounted on the link part 640 and accommodates the tools 10. One of the gripper parts 650 accommodates one tool 10.

The release part 660 is installed on the main frame 610 so that the gripper part 650 gripping the standby tool 3 is positioned adjacent to the standby position T2. The release part 660 serves to unclamp the standby tool 3 accommodated in the gripper part 650 positioned at the standby position T2 based on a tool change instruction signal from the control part 1000.

As illustrated in FIGS. 3 to 18, the gripper parts 650 of the magazine unit 600 of the tool magazine 1 of the machine tool according to the embodiment of the present disclosure each include a fixing part 651, a moving part 652, a handle part 653, guide shaft parts 654, and a pressing part 655.

One side of the fixing part 651 is coupled to the link part 640, and the flange portion 14 of the tool is seated on the fixing part 651. As illustrated in FIGS. 3 to 7, 10, 11, 13, and 15, the fixing part 651 includes finger portions 651a and a key 651b.

The finger portions 651a support a lower portion of the flange portion 14 of the tool 10 and grip the tool in conjunction with the pressing part 655 to be described below. The finger portion 651a has an approximately "⊏" shape and defines an external shape of the fixing part 651. That is, the flange portion 14 of the tool may be stably seated on the finger portions 651a, such that the tools may be quickly changed.

The key 651b protrudes at an upper side of the finger portions 651a. The tool 10 may be securely fastened to the finger portions 651a and the pressing part 655 by the key 651b, such that the directionality of the tool 10 is maintained. Therefore, the tools may be easily changed between the gripping parts 841 and 842 of the change arm 840 and the spindle 500, thereby reducing the tool change time and improving the productivity of the machine tool.

The moving part 652 is installed at one upper side of the fixing part 651 so as to be movable upward and downward in the height direction. That is, the moving part 652 is provided to be moved upward or downward by the operations of the handle part 653 and a piston 662 of the release part 660 which will be described below. As illustrated in FIGS. 3 to 7, 10, 11, 13, and 15, the moving part 652 has therein a stepped portion 652a that comes into contact with a tip of a stopper portion 653b of the handle part when the handle part 653 is moved upward or downward by the operation of the piston 662. The moving part 652 is provided in the form of a rectangular parallelepiped block, but the present disclosure is not necessarily limited thereto.

The handle part 653 is inserted into the moving part 652. The handle part 653 moves the moving part 652 upward or downward by the operation of the release part 660. As illustrated in FIGS. 3 to 7, 10, 11, 13, and 15, the handle part 653 includes the stopper portion 653b formed on a lower portion of the handle part 653. When a head portion 653a of the handle part is moved upward by catching projection portions 663a as the piston 662 moves upward, the stopper portion 653b comes into contact with the stepped portion 652a of the moving part to move the moving part 652 upward in conjunction with the stepped portion 652a.

The guide shaft parts 654 are inserted into the moving part 652 so as to be parallel to each other while facing each other based on the handle part 653. As illustrated in FIG. 5, the guide shaft parts 654 each include an elastic member 654a installed on a lower portion of each of the guide shaft parts 654, and the elastic members 654a press the moving part 652 downward so that the moving part 652 comes into contact with the fixing part 651 in the state in which the moving part 652 moves downward so that the gripper part 650 clamps the tool 10. That is, the elastic member 654a may be a spring that may apply an elastic force for always pressing the guide shaft part 654 downward. Since the elastic members 654a of the guide shaft parts apply the elastic force to constantly press the moving part 652 downward, support portions 665b and a close-contact portion 655a of the pressing part 655 comes into contact with and presses a tapered surface 13 of a shank portion 12 of the tool, such that it is possible to always maintain a state in which the gripper part 650 clamps the tool. In addition, when the tool changing part 800 is moved by the tool changing part transfer part 900 to withdraw the tool unclamped from the gripper part 650, the piston 662 of the release part 660, which will be described below, is operated by the control part. When the handle part 653 is moved upward in a state in which the catching projection portions 663a of a hanging part 663 are in contact with the head portion 653a of the handle part, the pressure applied to the tapered surface of the shank portion of the tool is eliminated, such that the tool may be withdrawn from the gripper part in the direction perpendicular to the tool axis.

The pressing part 655 is installed at one side of the moving part 652 and presses the accommodated tool 10 to clamp the tool 10. As illustrated in FIGS. 3 to 7, 10, 11, 13, and 15, the pressing part 655 includes the close-contact portion 655a and the support portions 655b.

The close-contact portion 655a is tapered so as to come into contact with the tapered surface 13 of the shank portion 12 of the tool. The support portion 655b protrudes to come into contact with a circumferential surface of the shank portion 12 of the tool to clamp the tool. That is, since the close-contact portion 655a and the finger portions 651a primarily clamp the tool, the tool is prevented from separating from the gripper part even though the link part is rotated by the motor part. Therefore, it is possible to prevent a safety accident and reduce maintenance costs that may be incurred due to the damage to the tool. In addition, since the support portions 655b and the close-contact portion 655a secondarily clamp the tool and thus grip the circumferential surface of the shank portion of the tool once more, the shank portion of the tool is supported at the three points and securely clamped. It is possible to prevent the separation of the tool during the rotation and easily grip a large-sized, heavy tool, thereby maximizing the efficiency of the machine tool and reducing the maintenance time that may increase due to the damage to the tool. As a result, it is possible to maximize the productivity.

As illustrated in FIGS. 6 and 7, the close-contact portion 655a has a gradient corresponding to a gradient of the tapered surface 13 of the shank portion 12. That is, the close-contact portion 655a has an inclination gradient opposite to an inclination gradient of the tapered surface 13 of the shank portion 12 of the tool, such that it is possible to press and clamp the tool supported at the three points by the elastic force of the elastic members 654a of the guide shaft parts 654.

As illustrated in FIGS. 3 to 18, the release part 660 of the magazine unit 600 of the tool magazine 1 of the machine tool according to the embodiment of the present disclosure includes a cylinder 661, the piston 662, and the hanging part 663.

The cylinder frame 661 is provided on the main frame 610 and disposed in the height direction so as to be adjacent to the standby position.

The piston 662 is installed in the cylinder 661 and reciprocates upward and downward in the height direction.

The hanging part 663 is installed at a tip of the piston in the cylinder 662 and moves the handle part 663 upward and downward in conjunction with the upward or downward movement of the piston 662 in the height direction. As illustrated in FIGS. 3 to 7, 10, 11, 13, and 15, the hanging part 663 includes the catching projection portions 663a bent inward from two opposite sides of a lower tip of the hanging part. The tool is unclamped from the gripper part as the handle part 653 moves upward in a state in which the catching projection portions 663a are in contact with the head portion 653a of the handle part.

As illustrated in FIGS. 13 and 15, in the state in which the gripper part 650 of the magazine unit 600 clamps the tool 10, a lower portion of the head portion 653a of the handle part and the catching projection portions 663a are always spaced apart from one another at a second interval 663c, and an upper portion of the head portion 653a of the handle part and the catching portion 663 are always spaced apart from each other at a first interval 663b. That is, when the tool is clamped in a state in which the piston is not operated, i.e., in a state in which the catching projection portions 663a do not move the head portion 653a of the handle part upward, the first interval and the second interval are always maintained, the link part and the gripper part may rotate without separate interference even though the link part is rotated by the operation of the motor part and thus the gripper part for clamping the tool is rotated. Therefore, the gripper part in the magazine unit, which clamps the tool to be used for a subsequent process based on the machining program, rotates to the standby position at which the release part is positioned, and then the gripper part is on standby while the spindle machines a workpiece with the processing tool.

Therefore, it is possible to minimize the standby time and the movement time, quickly change the tools, maximize the productivity of the medium-sized or large-sized machine tool having a long length in the width direction, automatically change the tools, and maximize the user's convenience.

The principle of changing the tools by the tool magazine of the machine tool according to the embodiment of the present disclosure will be described with reference to FIGS. 3 to 18.

Figure 12:
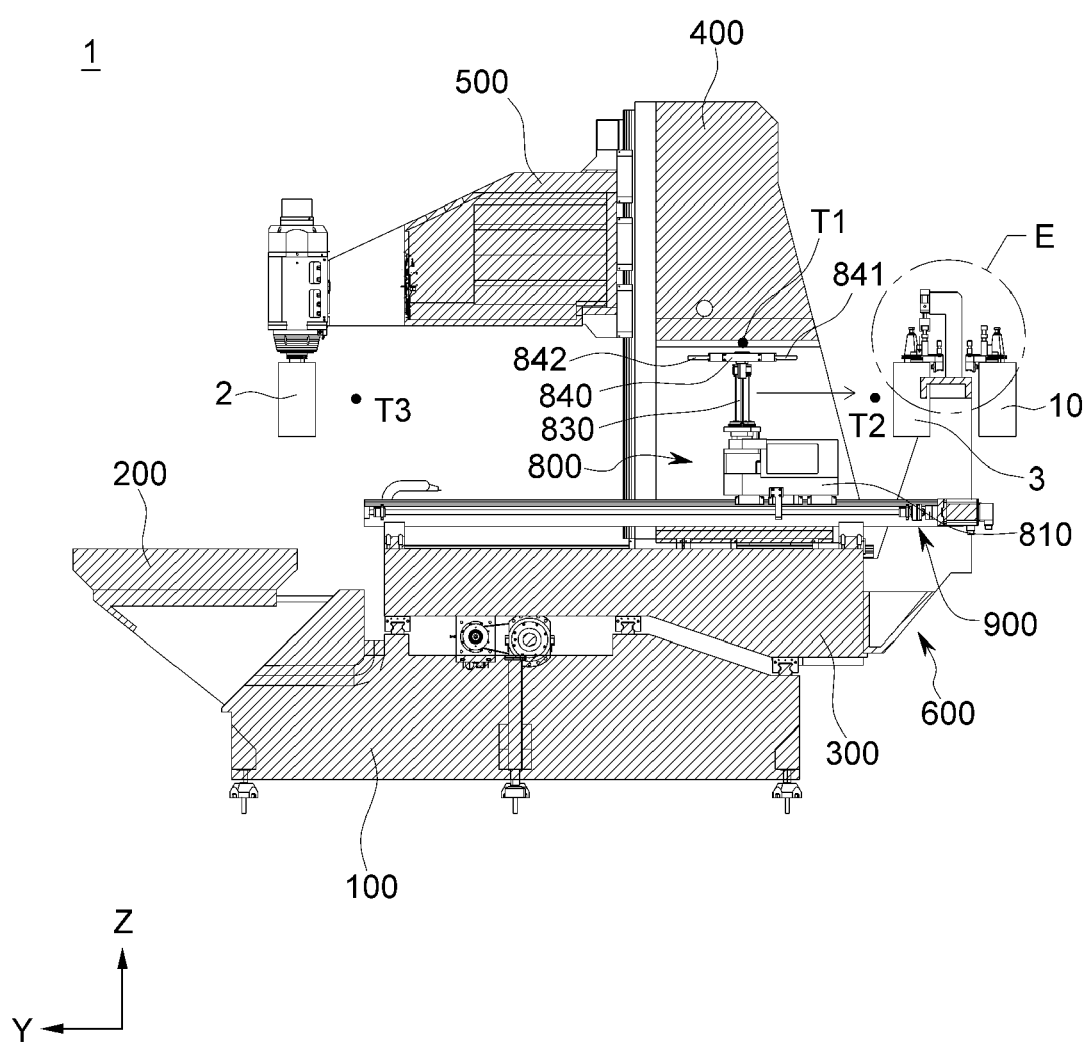
Figure 13:
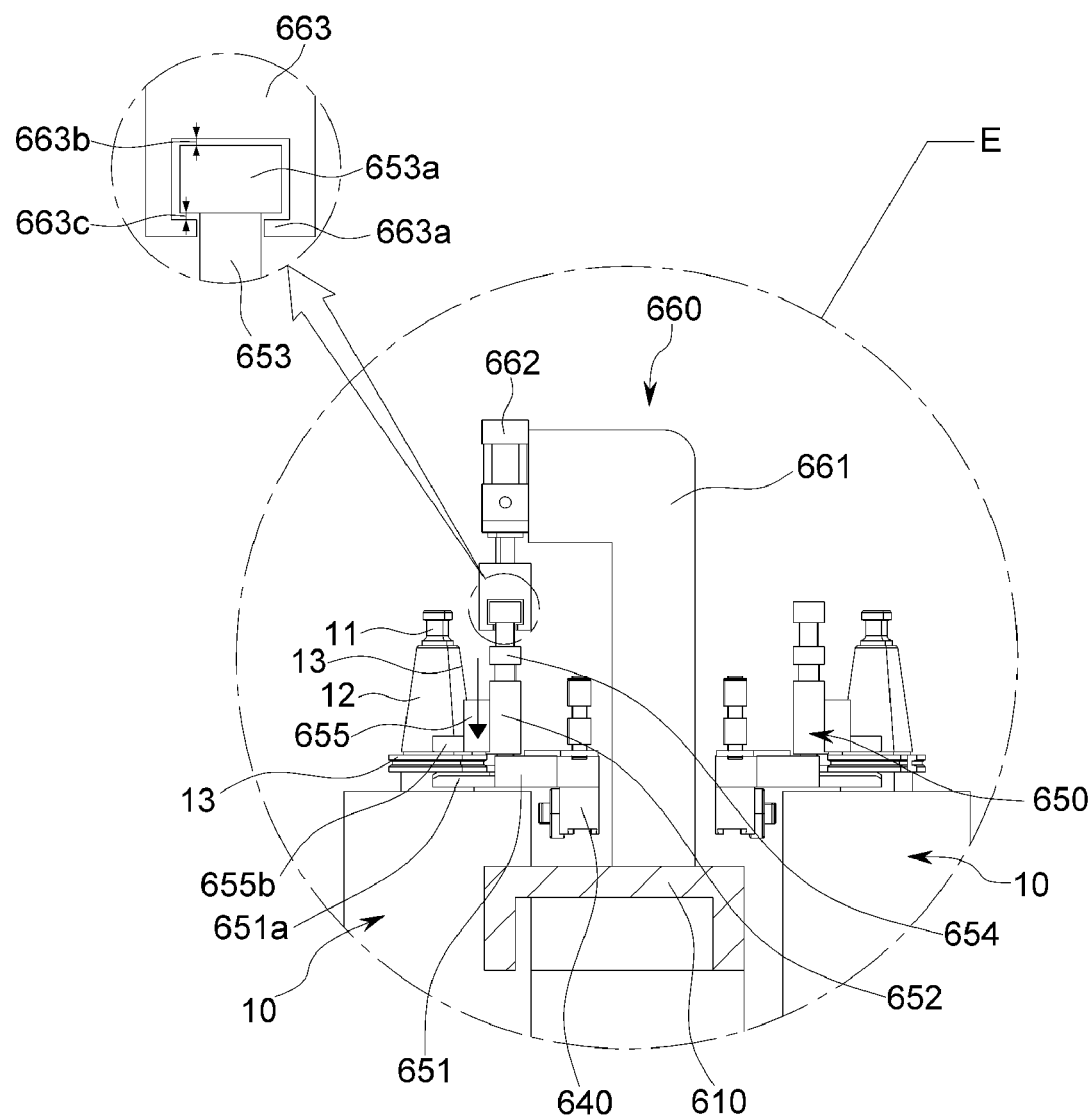
FIG. 13 is an enlarged view of part E in FIG. 12.
Figure 14:
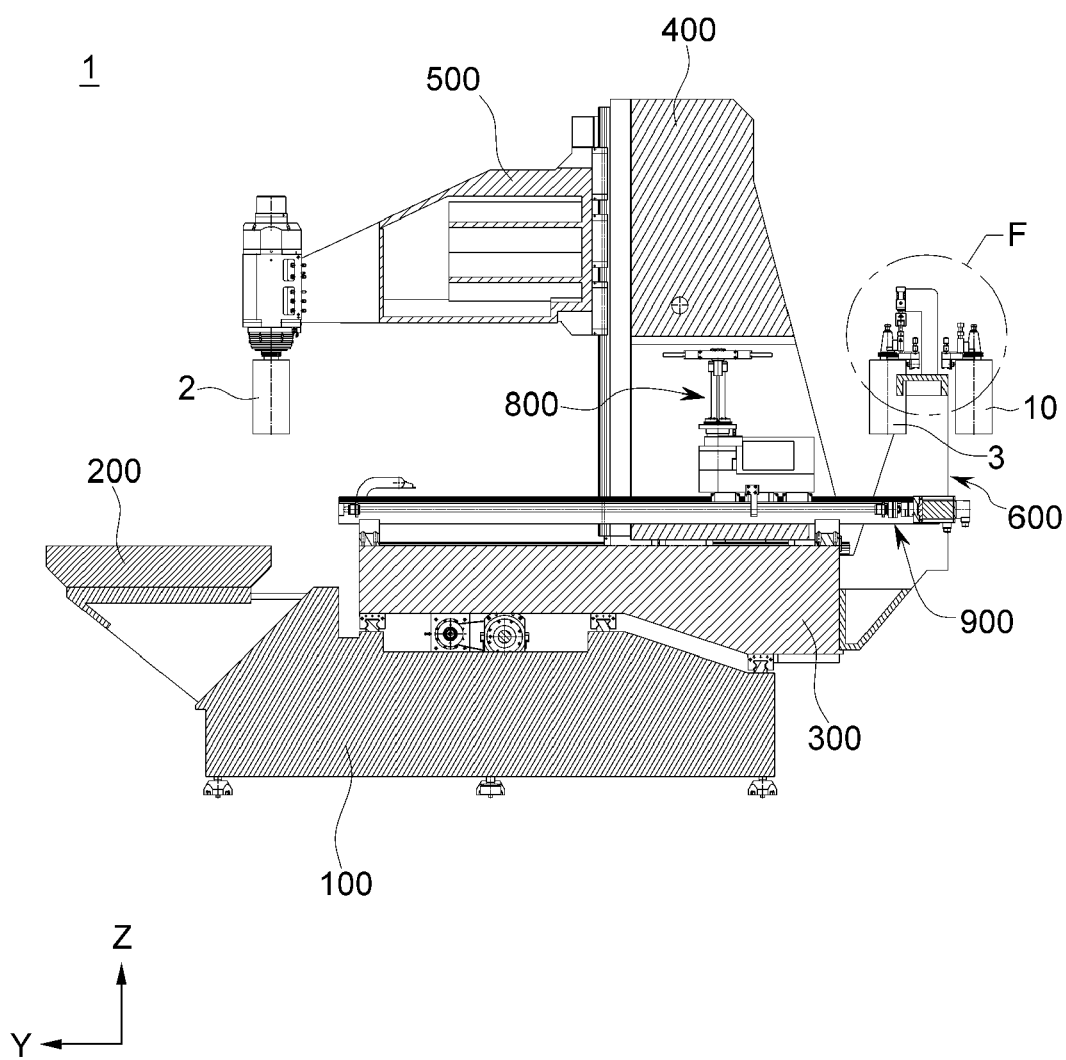

As illustrated in FIG. 12, during the process of machining the workpiece with the processing tool 2 on the spindle 500, the tool changing part 800 is initially on standby at the initial position T1 between the upper portion of the saddle 300 and the column 400.

In this case, the gripper of the magazine unit, which accommodates the standby tool 3 to be used for the subsequent process based on the machining program, is positioned at the standby position T2.

As described above, in order to prevent the tool from separating from the gripper part, the gripper part needs to clamp the tool before the process of changing the tools.

As illustrated in FIG. 13, in the state in which the piston 662 is not operated by the control part, the lower portion of the head portion 653a of the handle part and the catching projection portions 663a are kept spaced apart from one another at the second interval 663c, and the upper portion of the head portion 653a of the handle part and the catching portion 663 are kept spaced apart from each other at the first interval 663b. In this case, as illustrated in FIGS. 3 to 7, by the elastic force of the elastic members 654a of the guide shaft parts 654, the moving part 652 is kept in contact with the fixing part 651, i.e., kept in a lowered state, and at the same time, and the stopper portion 653b of the handle part is kept spaced apart from the stepped portion 652a of the moving part. In this state, the close-contact portion 655a and the support portions 655b of the pressing part supports the tapered surface 13 of the shank portion of the tool at the three points, and the finger portions 651a of the fixing part support the lower portion of the flange portion 14 of the tool, thereby clamping the tool.

As illustrated in FIG. 12, when it is necessary to replace the processing tool 2 mounted on the spindle 500 with the standby tool 3 accommodated in the gripper part 650 of the magazine unit 600, the tool changing part 800 is rectilinearly moved by the tool changing part transfer part 900 from the initial position T1 to the standby position T2 independently of the column 400, and the first gripping part 841 of the change arm 840 grips the standby tool 3 to change the tools.

As described above, the gripper part 650 of the magazine unit needs to unclamp the tool in order to grip the tool by rectilinearly moving the gripping part of the change arm 840. This process will be described with reference to FIG. 15.

The control part operates the piston 662. That is, when the piston 662 operates, the piston moves upward, and at the same time, the hanging part 662 also moves upward in the height direction. In this case, the catching projection portions 663a of the hanging part 662 comes into contact with the head portion 653a of the handle part and moves the handle part 653 upward by the height by which the piston moves upward. That is, with a force higher than the elastic force of the elastic members 654a of the guide shaft parts being in contact with the stepped portion 652a of the moving part, the stopper portion 653b of the handle part moves the handle part 653 upward by the height by which the piston moves upward. In this case, as illustrated in FIGS. 3 to 7, in the state in which the elastic force of the elastic members 654a of the guide shaft parts 654 is eliminated, the moving part 652 is spaced apart from the fixing part 651, and the pressing part 655 coupled to the moving part 652 may also move upward. That is, as the moving part 652 moves upward, the pressing part 655 may also move upward, the close-contact portion 655a and the support portions 655b of the pressing part are separated from the tapered surface 13 of the shank portion of the tool, and the finger portions 651a of the fixing part keep supporting only the lower portion of the flange portion 14 of the tool.

When the gripping part of the change arm of the tool changing part is rectilinearly moved by the tool changing part transfer part in this state, the gripping part of the change arm directly grips the flange portion of the tool, and the tool is withdrawn in the direction perpendicular to the tool axis from the gripper part of the magazine unit.

Because the process of inserting the tool into the gripper part of the magazine unit is performed in the reverse order to the above-mentioned process, a detailed description thereof will be omitted.

Figure 17:
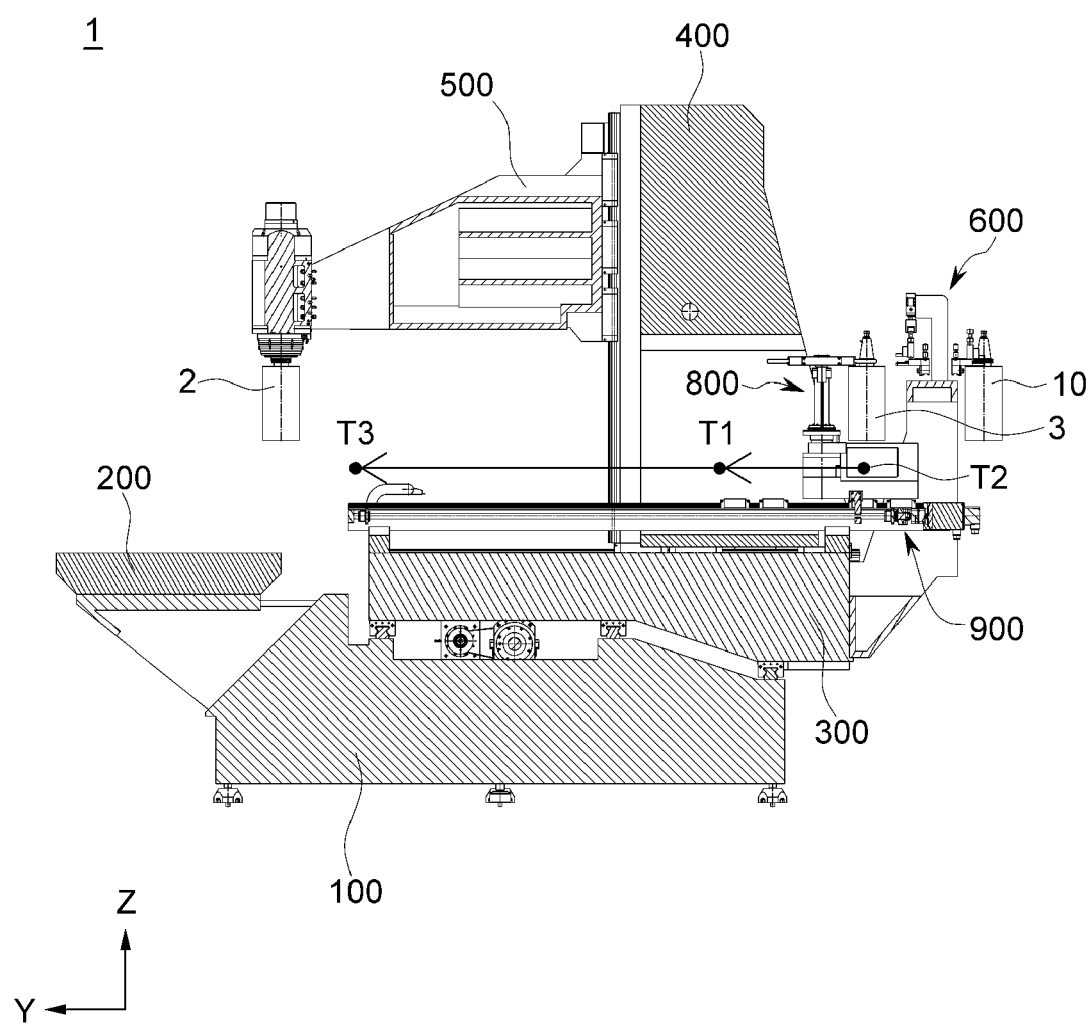

As illustrated in FIG. 17, in the state in which the first gripping part 841 of the change arm 840 grips the standby tool 3, the tool changing part 800 rectilinearly moves from the standby position T2 to the change position T3 as the tool changing part transfer part 900 operates based on the signal from the control part 1000.

When the tool changing part 800 moves from the standby position T2 to the change position T1, the spindle 500 moves downward to the lower spindle gripping position so that the second gripping part 842 of the change arm grips the processing tool 2. Thereafter, the spindle 500 moves upward to the upper spindle gripping position at the change position T3 so that the second gripping part of the change arm of the tool changing part 800, which grips the processing tool 2, unclamps the processing tool from the spindle 500.

Thereafter, the second gripping part 842 of the change arm grips the processing tool 2 unclamped from the spindle 500, and the change arm 840 of the tool changing part 800 rotates based on the signal from the control part 1000 to replace the processing tool with the standby tool after the spindle 500 moves upward to the upper gripping position.

Thereafter, the spindle 500 moves downward to the lower spindle gripping position to clamp the standby tool 3 gripped by the first gripping part 841 of the change arm.

Thereafter, the spindle 500 moves upward to the upper spindle gripping position to clamp the standby tool.

Thereafter, the tool changing part 800 rectilinearly moves from the change position T3 to the standby position T2 based on the signal from the control part 1000 to return the processing tool 2, which is gripped by the second gripping part 842 of the change arm, to the gripper part of the magazine unit.

Thereafter, the tool changing part 800 returns the processing tool, which is gripped by the second gripping part 842 of the change arm, to the gripper part of the magazine unit only by rectilinearly moving.

Figure 18:
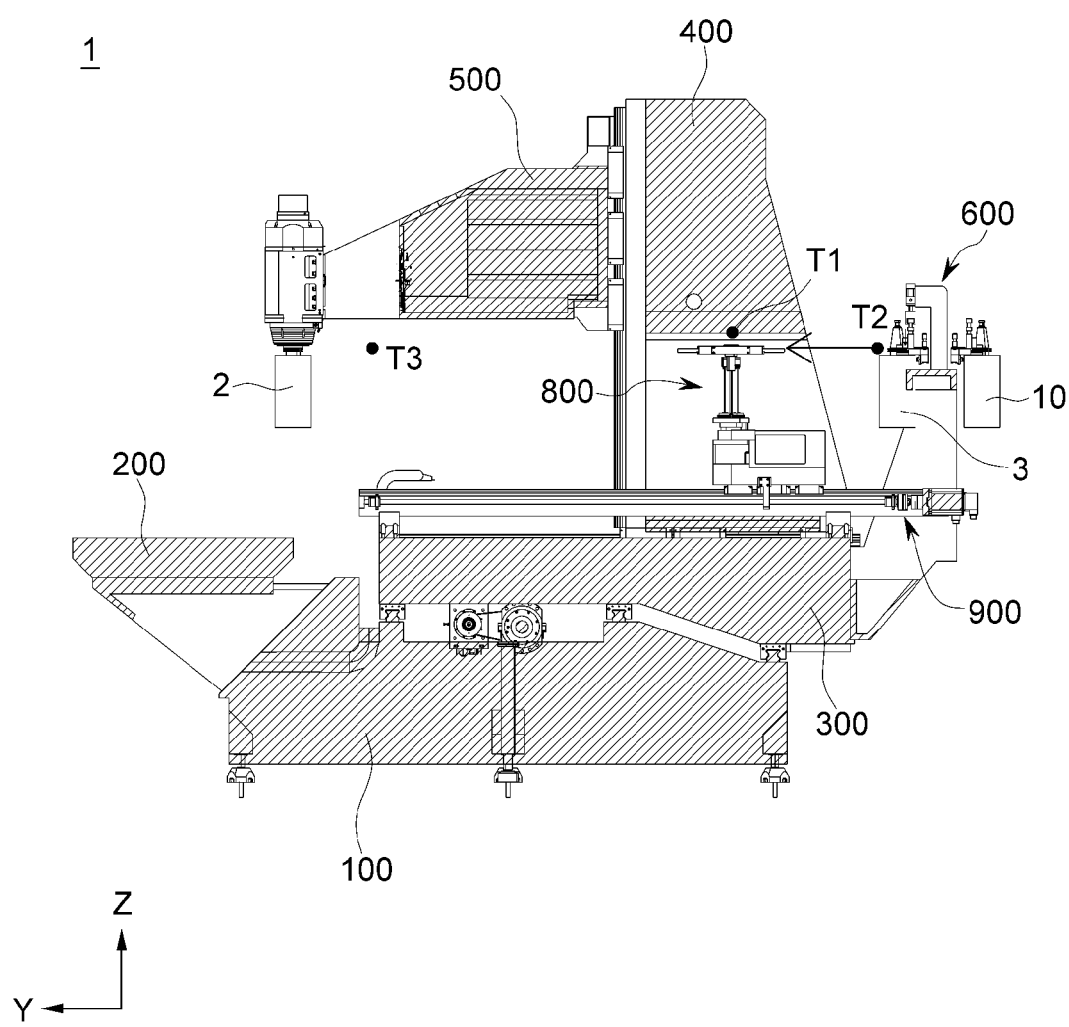

Thereafter, as illustrated in FIG. 18, the tool changing part 800, which has returned the standby tool, rectilinearly moves to the initial position T1 based on the signal from the control part 1000, and the spindle 500 performs the subsequent process with the standby tool 3 clamped by the spindle 500 based on the sequence of the machining program. The gripper part, which grips the tool to be used for a subsequent process, is positioned at the standby position T2, and in a state in which the piston is not operated, the elastic force of the elastic members of the guide shaft parts maintains the state in which the pressing part and the finger portions of the fixing part clamp the tool.

As described above, according to the tool magazine of the machine tool according to the present disclosure, the respective constituent components including the magazine unit and the tool changing part may be small in size, and the entire machine tool may be small in size and light in weight, such that the spatial utilization may be maximized, and the maintenance and manufacturing costs are reduced.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. A tool magazine of a machine tool, the tool magazine comprising:
   a magazine unit having a plurality of gripper parts configured to accommodate tools to supply the tools to a spindle, each of the gripper parts being configured to store a respective one of the tools, and the magazine unit being installed on a saddle such that the magazine unit moves together with the saddle when the saddle moves; and
   a tool changing part movably installed on the saddle to replace a tool mounted on a spindle with a tool accommodated in a respective one of the gripper parts,
   wherein,
   each of the tools is loaded or unloaded to/from a respective one of the gripper parts in a direction perpendicular to an axis of each of the tools,
   the tool changing part comprises a change arm having grips and being configured to grip the tool accommodated in the respective one of the gripper parts or the tool mounted on the spindle,
   the grips of the change arm are configured to grip a flange portion of the tool accommodated in the respective one of the gripper parts or the tool mounted on the spindle by a rectilinear movement of the tool changing part, and
   each of the gripper parts clamps a respective one of the tools accommodated in the respective one of the gripper parts while avoiding a flange portion of the respective one of the tools, the magazine unit further comprises:
- a main frame;
- a support frame configured to couple the main frame to the saddle;
- a motor installed on the main frame or the support frame and configured to generate a rotational power;
- a link installed to be movable along the main frame by the rotational power of the motor; and
- a release part installed on the main frame so as to be adjacent to a standby position and configured to unclamp a standby tool accommodated in a respective one of the gripper parts located at the standby position, the plurality of the gripper parts are mounted on the link and configured to accommodate the tools, each of the gripper parts comprises:
- a fixing part coupled to the link;
- a moving part installed on the fixing part so as to be movable upward and downward;
- a handle part configured to move the moving part upward or downward by an operation of the release part;
- two guide shafts installed on the moving part in parallel, facing each other with the handle part located in the middle of the two guide shafts; and
- a pressing part installed on the moving part and configured to press the accommodated tool to clamp the tool, each of the two guide shafts comprises an elastic member installed on a lower portion of a corresponding guide shaft and configured to press the moving part downward so that the moving part comes into contact with the fixing part when the respective one of the gripper parts clamps the tool.

2. The tool magazine of claim 1, wherein the release part comprises:
- a cylinder provided on the main frame;
- a piston installed in the cylinder and configured to reciprocate upward or downward; and
- a hanging part installed at a tip of the piston and configured to move the handle part upward or downward in conjunction with the upward or downward movement of the piston.

3. The tool magazine of claim 2, wherein the hanging part comprises catching projection portions bent inward from two opposite sides of a lower tip of the hanging part.

4. The tool magazine of claim 3, wherein the handle part comprises a stopper portion provided on a lower portion of the handle part, and the stopper portion is configured to come into contact with a stepped portion of the moving part to move the moving part upward when the piston is moved upward and a head portion of the handle part is moved upward by the catching projection portions.

5. The tool magazine of claim 4, wherein when each of the gripper parts clamps a respective one of the tools, a lower portion of the head portion of the handle part is spaced apart from the catching projection portions, and an upper portion of the head portion of the handle part is spaced apart from the hanging part.

6. The tool magazine of claim 1, wherein the fixing part comprises:
- a finger portion configured to support a lower portion of the flange portion of the tool; and
- a key protruding at an upper side of the finger portion.

7. The tool magazine of claim 1, wherein the pressing part comprises:
- a close-contact portion tapered to be in contact with a tapered surface of a shank portion of the tool; and
- a support portion protruding and configured to clamp the tool by coming into contact with a circumferential surface of the shank portion of the tool.

8. The tool magazine of claim 7, wherein the close-contact portion has a gradient corresponding to a gradient of the tapered surface of the shank portion.

9. The tool magazine of claim 1, further comprising:
- a bed;
- a table installed on the bed and configured to allow a workpiece to be seated thereon;
- a saddle movably installed on the bed;
- a column movably installed on the saddle; and
- a spindle movably installed on the column and configured to machine the workpiece.

10. The tool magazine of claim 9, further comprising:
- a transfer part configured to move the saddle, the column, and the spindle; and
- a tool changing part transfer part installed on the saddle and configured to move the tool changing part over the saddle independently of the transfer part.

* * * * *